United States Patent
Hedrick

(10) Patent No.: US 10,695,775 B1
(45) Date of Patent: Jun. 30, 2020

(54) DUAL STAGE CYCLONE SEPARATOR, DUAL STAGE CYCLONE SEPARATOR ASSEMBLY, AND METHOD OF USING SAME

(71) Applicant: Brian W. Hedrick, Oregon, IL (US)

(72) Inventor: Brian W. Hedrick, Oregon, IL (US)

( * ) Notice: Subject to any disclaimer, the term of this patent is extended or adjusted under 35 U.S.C. 154(b) by 0 days.

(21) Appl. No.: 16/696,940

(22) Filed: Nov. 26, 2019

(51) Int. Cl.
  *B01D 45/12* (2006.01)
  *B04C 5/04* (2006.01)
  *B01D 45/16* (2006.01)
  *B04C 5/16* (2006.01)
  *B04C 5/103* (2006.01)
  *B01D 50/00* (2006.01)
  *A47L 9/16* (2006.01)

(52) U.S. Cl.
  CPC ............... *B04C 5/04* (2013.01); *B01D 45/12* (2013.01); *B01D 45/16* (2013.01); *B04C 5/103* (2013.01); *B04C 5/16* (2013.01); *A47L 9/1683* (2013.01); *B01D 50/002* (2013.01)

(58) Field of Classification Search
  CPC .. B04C 5/04; B04C 5/16; B04C 5/103; B01D 45/16; B01D 45/12; B01D 50/002; A47L 9/1683
  See application file for complete search history.

(56) References Cited

U.S. PATENT DOCUMENTS

| | | | | | |
|---|---|---|---|---|---|
| 1,735,298 A | * | 11/1929 | Pfeffer | ...................... | B04C 3/04 55/343 |
| 2,281,610 A | * | 5/1942 | Watson | ..................... | B04C 5/04 55/344 |
| 2,372,514 A | * | 3/1945 | Pootjes | ..................... | B04C 5/24 55/343 |
| 2,866,518 A | * | 12/1958 | Lincoln | ..................... | B04C 5/28 55/344 |
| 2,889,008 A | * | 6/1959 | Copp | ........................ | B04C 5/28 55/348 |
| 3,169,842 A | * | 2/1965 | Streete | ...................... | B04C 5/14 55/449 |
| 3,386,588 A | * | 6/1968 | Ades | ......................... | B04C 5/28 210/512.2 |
| 3,425,192 A | * | 2/1969 | Davis | .................... | A47L 9/1641 55/345 |
| 4,162,906 A | * | 7/1979 | Sullivan | .................... | B04C 3/00 210/512.1 |

(Continued)

*Primary Examiner* — Dung H Bui
(74) *Attorney, Agent, or Firm* — Braun IP Law, LLC; Jeanette M. Braun

(57) ABSTRACT

A compact dual stage cyclone separation assembly, an efficient dual stage cyclone separator, and a method for utilizing the same, comprising a lower pressure drop across the dual stage separators due to fewer particle-contaminated gas flow directional changes in the particle contaminated gas stream, and method for using same. The dual stage cyclone separator comprises a primary stage cyclone barrel and a second stage cyclone barrel, wherein the second stage cyclone barrel is coaxial with and concentric within the first cyclone separator, a solids extraction port, wherein said sidewall of said main body defines a solids extraction port opening located between said upper end and said lower end for discharging large particles from said cyclone body, and a small particle discharge opening, wherein the small particle discharge opening is located inside the lower end of the main body.

21 Claims, 13 Drawing Sheets

(56) References Cited

U.S. PATENT DOCUMENTS

| | | | | |
|---|---|---|---|---|
| 4,197,102 | A * | 4/1980 | Decker | B01D 45/16 55/449 |
| 4,247,313 | A * | 1/1981 | Perry, Jr. | B01D 46/0068 55/302 |
| 4,289,611 | A * | 9/1981 | Brockmann | B04C 3/04 209/710 |
| 4,430,100 | A * | 2/1984 | Cardo | B01D 45/12 209/154 |
| 4,585,466 | A * | 4/1986 | Syred | B04C 5/08 55/349 |
| 4,591,367 | A * | 5/1986 | Pek | B01D 45/12 55/344 |
| 6,432,173 | B1 * | 8/2002 | Johnson | B04C 5/06 95/269 |
| 6,896,720 | B1 * | 5/2005 | Arnold | A47L 9/1608 55/394 |
| 7,879,123 | B2 * | 2/2011 | Lundquist | B04C 3/00 55/306 |
| 2005/0011170 | A1 * | 1/2005 | Christiansen | B01D 45/16 55/345 |
| 2008/0006250 | A1 * | 1/2008 | Bula | B01D 45/04 123/559.1 |
| 2010/0115727 | A1 * | 5/2010 | Oh | A47L 9/1625 15/347 |
| 2013/0247764 | A1 * | 9/2013 | Kvamsdal | B04C 3/04 96/188 |

\* cited by examiner

DUAL STAGE CYCLONE SEPARATOR, DUAL STAGE CYCLONE SEPARATOR ASSEMBLY, AND METHOD OF USING SAME

I. TECHNICAL FIELD

The present disclosure generally relates to cyclone separation devices, cyclone separator assemblies, and methods for using same to separate gas and entrained particles from a particle-contaminated gas stream.

II. BACKGROUND

There is a general desire to collect particulates in gas streams and for disposal or reuse. As one example, though this disclosure is not to be limited to oil refinery operations, in the area of oil refinery operations, one particular area of concern regarding catalyst retention in the circulating inventory of the reactor and regenerator.

The fluid catalytic cracking (FCC) process is well known and has undergone continuous improvement and remains the predominant methodology of gasoline production in many refineries. Generally, gasoline, as well as lighter products, is formed as the result of cracking heavier (i.e. higher molecular weight), less valuable hydrocarbon feed stocks such as gas oil. A general outline of the FCC process is provided below, although it is to be appreciated that the FCC process is a large and complex process involving many factors that are not addressed.

In its most general form, the FCC process involves use of a reactor that is closely coupled with a catalyst regenerator, followed by downstream hydrocarbon product separation. The catalyst regenerator collects spent catalyst having coke on the surface thereof, combusts the coke from the surface of the spent catalyst to refresh the catalyst, and returns the refreshed catalyst to the reactor. One specific feature of the FCC process is the continuous fluidization and circulation of large amounts of catalyst having an average particle diameter of about 50-100 microns, equivalent in size and appearance to very fine sand. For every ton of cracked product made, approximately 5 tons of catalyst are needed, thus highlighting the significance of the catalyst regenerator in the FCC process. Coupled with the need for a large inventory and recycle of a small particle diameter catalyst is the ongoing challenge to prevent this catalyst from exiting the reactor and/or catalyst regenerator system into effluent streams.

A fluidized-bed catalytic cracking plant can comprise a reactor vessel, a vertical reactor riser having an upper outlet which is in fluid communication with a separator system arranged in the reactor vessel, and a regenerator vessel. During normal operation, regenerated catalyst particles and hydro-carbonaceous feed are supplied to the inlet end of the reactor riser in which catalytic cracking of the feed takes place to form a mixture of gaseous product and catalyst particles. The mixture leaves the reactor riser at a high temperature of between 500 and 540° C. or higher. The mixture of gaseous product and catalyst particles is passed into the separator system where gaseous product is separated from catalyst particles. The gaseous product is removed from the upper end of the reactor vessel, and the catalyst particles are discharged to the lower part of the reactor vessel where they are stripped. Stripped catalyst particles are passed to the regenerator vessel where coke deposited on the particles during cracking is burnt-off at a high temperature to obtain combustion products and regenerated catalyst. The combustion products are removed from the upper end of the regenerator vessel and regenerated catalyst is re-used.

There remains a need for a compact separation assembly and improved efficiency of cyclone separators, in particular, creating a lower pressure drop across the dual stage separators due to fewer particle-contaminated gas flow directional changes in the particulate contaminated gas stream. The lower pressure drop provides for a greater compression ratio across a power recovery turbine and more horse power potential. The present disclosure provides solutions to the problems of cyclone separators and assemblies.

Other desirable features and characteristics of the present disclosure will become apparent from the subsequent detailed description and claims, taken in conjunction with the accompanying drawings and this background of the disclosure.

III. BRIEF SUMMARY OF THE DISCLOSURE

Dual stage cyclone separators and dual stage cyclone separator assemblies for separating gas and entrained particles from a particle-contaminated gas stream are provided. In one embodiment, a dual stage cyclone separator comprises a main body having an upper end, a lower end, with a sidewall extending therebetween that defines the outer wall of the primary stage cyclone, a central opening, and a primary stage cyclone barrel and a second stage cyclone separator, wherein the second stage cyclone separator is coaxial with and concentric within the primary cyclone separator. The second stage cyclone comprises at least one duct, one embodiment of the duct comprising an inner edge and an outer edge, wherein the outer edge of the inlet duct is located within an inch of the sidewall, the main body being in fluid communication with a gas inlet for receiving a particle-contaminated gas, and a centrifugal accelerator proximate to the said central opening to induce centrifugal acceleration of the particle-contaminated gas stream. The dual stage cyclone separator further comprises a gas outlet for discharging a clean gas stream from the dual stage cyclone separator and in fluid communication with a center portion of the main body located proximate to the first end of the main body, and a particle discharge opening, wherein said sidewall of said main body comprises a discharge opening located between said upper end and said lower end for discharging separated large particles from the primary stage cyclone.

In another embodiment, a cyclone separator comprises a dual stage cyclone body that is substantially cylindrical in shape. The dual stage cyclone separator body comprises an upper end and a lower end with a sidewall extending between the upper end and the lower end. The cyclone body comprises an outer wall that can define a cyclone gas inlet located adjacent to the first end for receiving the particle-contaminated gas stream. A cyclone gas outlet is located adjacent to the upper end for discharging a clean gas stream from the dual stage cyclone separator. A centrifugal accelerator can be located proximate to the cyclone gas inlet to induce centrifugal acceleration of the particle-contaminated gas stream. The sidewall of the cyclone body comprises an opening that defines a discharge opening located between the upper end and the lower end for discharging separated particles, particularly large particles though small particles may also exit the primary cyclone through said opening, from the main body.

In another embodiment, a dual stage cyclone separator comprises a separator inlet for receiving a particle-contaminated gas stream that comprises gas and entrained particles.

The dual stage cyclone separator comprises a first stage cyclone separator that has a first gas outlet for discharging a semi-cleaned gas stream into a second stage cyclone separator. The first stage cyclone and the second stage cyclone each comprise an outlet for discharging separated particles, mostly large particles but small particles may also be discharged through said outlet, that can be fluidly engaged with the dip leg attached to the second end of the main body through a dip leg attached in fluid communication with the outlet for the first stage cyclone (solids extraction port).

In another embodiment, a dual stage cyclone separator comprises a separator inlet for receiving a particle-contaminated gas stream that comprises walls. The walls can be made of approximately ½-inch steel and ¾-inch concrete abrasion resistant lining or of some other abrasion resistant material, gas and entrained particles, wherein the second stage cyclone separator is coaxial with and concentric within the first cyclone separator. In one embodiment, the second stage cyclone comprises a duct with an inner edge and an outer edge, wherein the outer edge of the inlet duct is located within an inch of the sidewall, the main body being in fluid communication with the separator inlet for receiving a particle-contaminated gas, and a centrifugal accelerator proximate to the said central opening to induce centrifugal acceleration of the dual stage cyclone separator.

In another embodiment, a dual stage cyclone separator comprises concentric cyclones that can be fit more compactly into an existing assembly than standard cyclones or dual cyclones.

In another embodiment, a dual stage cyclone separator comprises a primary cyclone barrel, wherein the diameter of the primary cyclone barrel can be determined by the distance between the standard cyclone barrel inside wall and its outlet tube outer wall.

In another embodiment, a dual stage cyclone separator comprises a primary cyclone in the concentric configuration with a secondary cyclone and has similar performance to that of a standard cyclone but does not have the performance loss associated with standard primary cyclones caused by gas migrating from the primary vortex to the secondary vortex.

In another embodiment, a dual stage cyclone separator comprises concentric cyclones having a lower pressure drop than standard or prior art cyclones.

In another embodiment, a dual stage cyclone separator comprises a primary cyclone and a secondary cyclone in a concentric relationship, wherein a solids extraction port ("SEP") in the vicinity of the inlet into the secondary cyclone collect particles from an upflow. The SEP can have a similar height as the secondary cyclone inlet and sufficient width to accommodate the thickness of the separated solids layer.

In another embodiment, the SEP has a tangential outlet that can start between 45° and 0° before the secondary cyclone inlet.

In another embodiment, the SEP can end at the same point that the secondary cyclone inlet meets the outer wall.

In another embodiment, the primary cyclone vortex can be initiated by a series of vanes whose combined outlet area is identical to the inlet area of a standard cyclone of the diameter identical to the one which is being replaced.

In another embodiment, a dual stage cyclone separator can comprise similar barrel lengths for the primary cyclone and secondary cyclone.

In another embodiment, a dual stage cyclone separator can comprise a secondary cyclone that follows the design rules of the standard secondary cyclone except for the inlet. The inlet can be truncated such that the outer edge of the inlet duct is located near the outer wall of the primary cyclone barrel.

In another embodiment, a dual stage cyclone separator can comprise a secondary cyclone length that is lengthened by the distance required to accommodate the primary vane assembly.

In another embodiment, a dual stage cyclone separator can comprise a secondary cyclone barrel that is of standard length or even longer than that required for the primary vane assembly. A longer barrel on the secondary cyclone can improve its performance.

In one embodiment of the present disclosure, a dual stage cyclone separator comprises a cyclone body having a main body having an upper end, a lower end, a cone with a downwardly decreasing diameter extending therebetween, and a central opening located inside the upper end, a primary stage cyclone barrel and a second stage cyclone barrel, wherein the second stage cyclone barrel is coaxial with and concentric within the first cyclone barrel, the second stage cyclone barrel having a second stage cyclone inlet, the main body being in fluid communication with a gas inlet for receiving a particle-contaminated gas, wherein the gas inlet is located near the top of the cone, a centrifugal accelerator to induce centrifugal acceleration of the particle-contaminated gas stream, a gas outlet for discharging a clean gas stream from the dual stage cyclone separator and in fluid communication with a center portion of the main body located proximate to the upper end of the main body, a solids extraction port, wherein said sidewall of said main body defines the discharge opening located between said upper end and said lower end for discharging large particles from said cyclone body, and a small particle discharge opening, wherein the small particle discharge opening is located inside the lower end of the main body.

In another embodiment of the present disclosure, the centrifugal accelerator is fixed to the cone and located in an annular space between the cone and an outer wall.

In another embodiment of the present disclosure, the centrifugal accelerator is a vane.

In another embodiment of the present disclosure, the vane comprises blades that can be angled at any angle between 8° and 20°, but can be angled at any angle therebetween such as 10 degrees, 10.024 degrees, 11 degrees, 11.215 degrees, 12 degrees, or combinations thereof. The vanes can be angled at non-integer degrees.

In another embodiment of the present disclosure, the blades are made of ½-inch steel, ¾-inch abrasion lining, or a hard surfacing material that can be abrasion resistant.

In another embodiment of the present disclosure, the second stage cyclone inlet is a volute comprising an inner edge and an outer edge, wherein the outer edge of the volute is situated within an inch of the sidewall.

In another embodiment of the present disclosure, the second stage cyclone inlet is not a volute and comprises at least one opening that extends through the exterior secondary cyclone barrel wall.

In another embodiment of the present disclosure, the second stage cyclone inlet comprises at least one particle guide.

In another embodiment of the present disclosure, the dual stage cyclone separator of further comprising a dip leg attached to, and in fluid communication with, the lower end.

In another embodiment of the present disclosure, the SEP comprises a dip leg that is in fluid communication with the dip leg attached to the lower end.

In another embodiment of the present disclosure, a dual stage cyclone separator assembly comprising more than 1 of the dual stage cyclone separator of claim 1.

In another embodiment of the present disclosure, a dual stage cyclone separator comprises a cyclone body having a main body having an upper end, a lower end, a cone with a downwardly decreasing diameter extending therebetween, and a central opening located in the upper end, a primary stage cyclone barrel and a second stage cyclone barrel, wherein the second stage cyclone barrel is coaxial with and concentric within the first cyclone barrel, the second stage cyclone comprising a secondary cyclone barrel having an exterior secondary cyclone barrel wall and an inner secondary cyclone barrel wall, the secondary cyclone barrel having at least one secondary cyclone inlet that is not a volute, wherein the secondary cyclone inlet is an opening that extends through the exterior secondary cyclone barrel wall, the main body being in fluid communication with a gas inlet for receiving a particle-contaminated gas, a centrifugal accelerator to induce centrifugal acceleration of the particle-contaminated gas stream, a gas outlet for discharging a clean gas stream from the dual stage cyclone separator and in fluid communication with a center portion of the main body located proximate to the upper end of the main body, solids extraction port, wherein said sidewall of said main body defines the solids extraction port located between said upper end and said lower end for discharging large particles from said cyclone body, and a small particle discharge opening, wherein the small particle discharge opening is located at a distal end of the central opening.

In another embodiment of the present disclosure, the second stage cyclone inlet comprises at least one particle guide.

In another embodiment of the present disclosure, the dual stage cyclone separator further comprises a cap having a centrally located throughbore for allowing clean gas to exit the dual stage cyclone separator.

In another embodiment of the present disclosure, the cap is welded to the top of the dual stage cyclone separator.

In another embodiment of the present disclosure, a method for separating large particles and small particles entrained in a particle-contaminated gas stream utilizes a dual stage cyclone separator, and the steps comprise forcing a particle-contaminated gas stream into a gas inlet and through a centrifugal accelerator in a dual stage cyclone separator, inducing centrifugal acceleration of the particle-contaminated gas stream through the centrifugal accelerator, wherein the centrifugal accelerator changes the flow of the particle-contaminated gas stream from upward to rotational, separating large particles from the particle-contaminated gas stream through the primary stage cyclone barrel, wherein the large particles exit the dual stage cyclone separator through the solids extraction port, creating a semi-clean gas stream comprising small particles, separating small particles from the semi-clean gas stream through the second stage cyclone, wherein the small particles exit the second stage cyclone through the cone, creating a clean gas stream not comprising small particles, and sending the clean gas stream through a clean gas outlet.

In another embodiment of the present disclosure, the method further comprises capturing the clean gas stream for use in energy generation.

In another embodiment of the present disclosure, the method further comprises allowing at least 2.5 revolutions of the particle-contaminated gas stream around the first stage cyclone.

In another embodiment of the present disclosure, the method further comprises assembling more than one dual stage cyclone vessel in an assembly.

In another embodiment of the present disclosure, the particle-contaminated gas stream, semi-clean gas stream, and clean gas stream do not change direction of rotational flow.

IV. BRIEF DESCRIPTION OF THE DRAWINGS

The present disclosure will hereinafter be described in conjunction with the following exemplary drawing figures, wherein like numerals denote like elements, and wherein.

Figure 7:
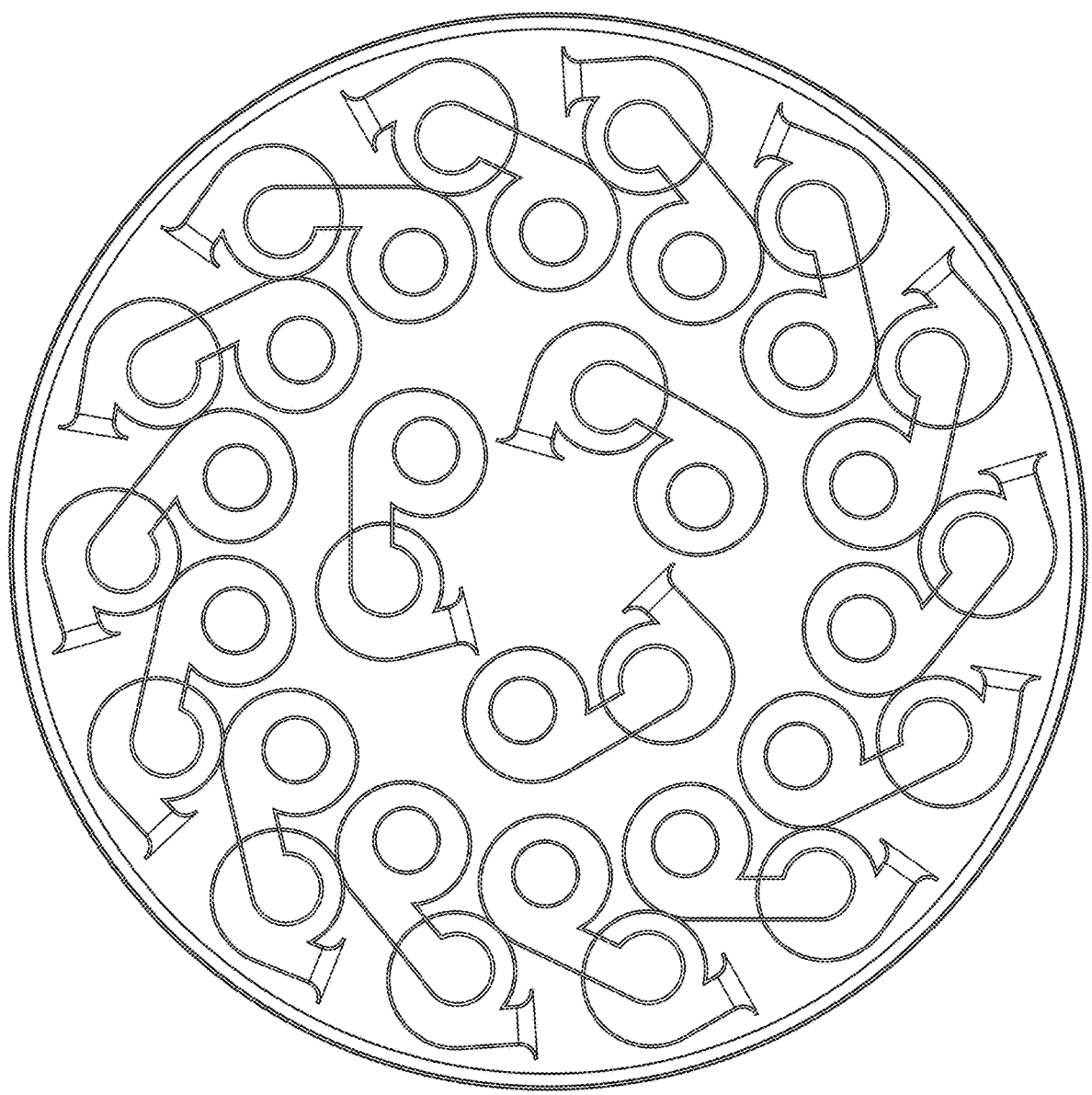
Figure 8:
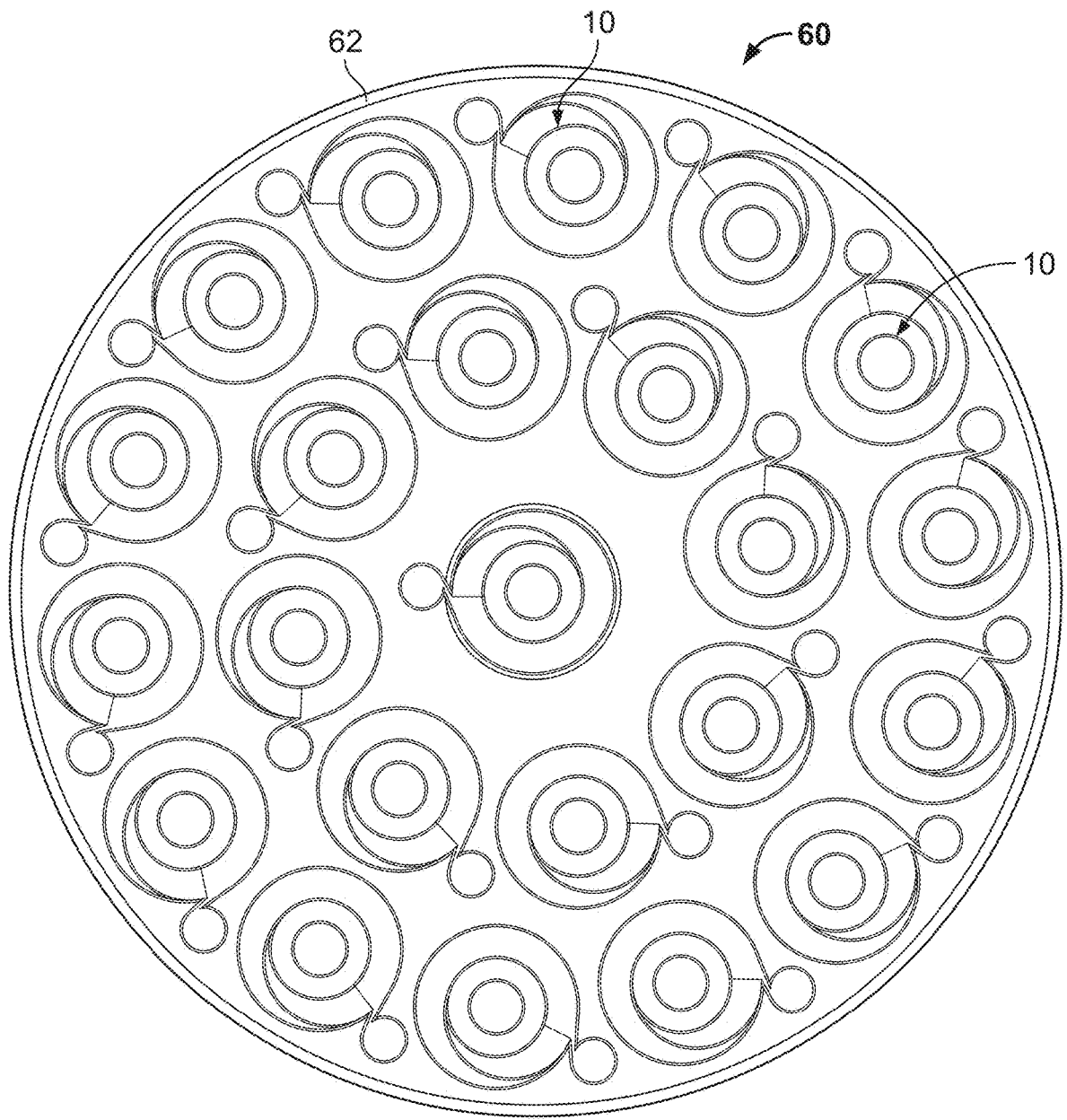
Figure 9:
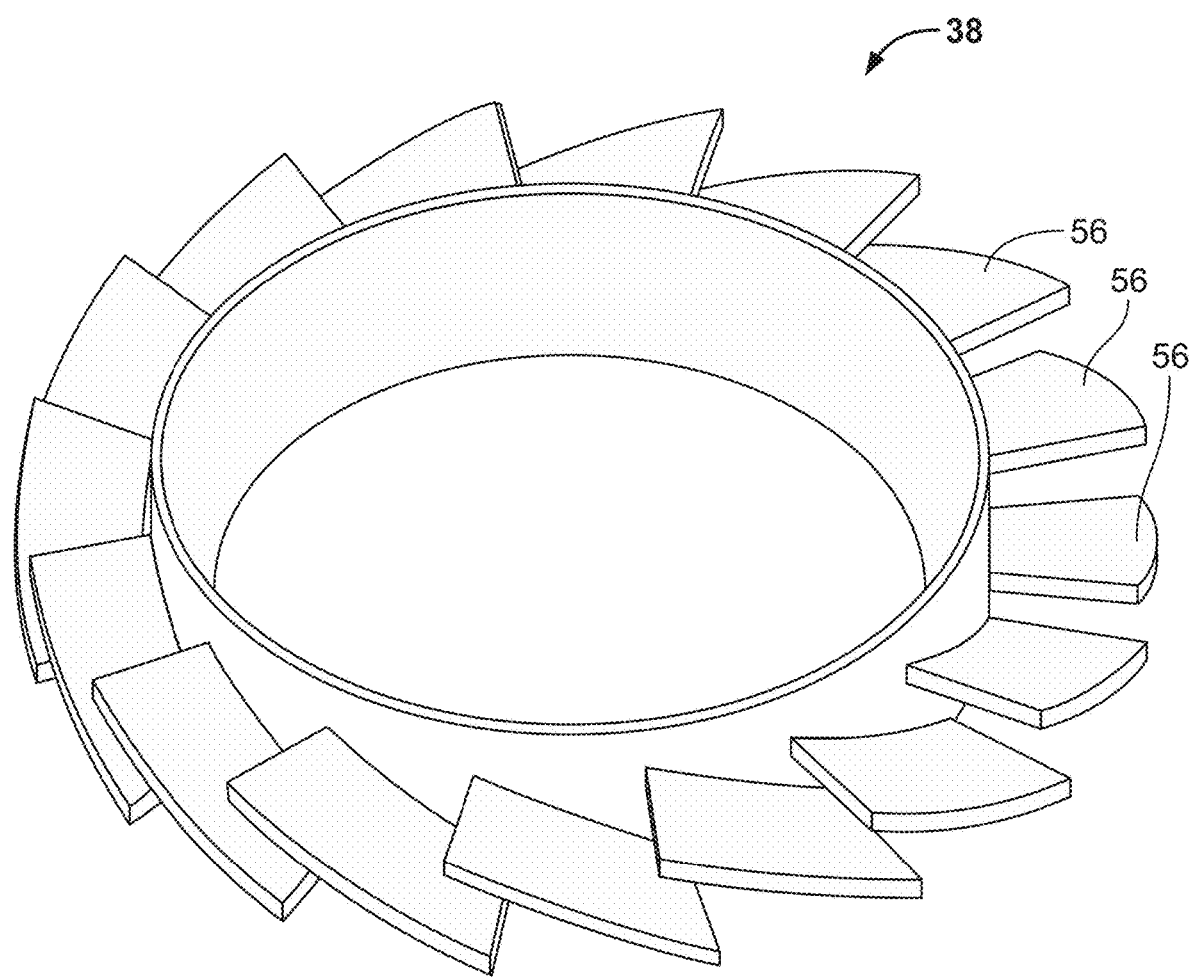
Figure 10:
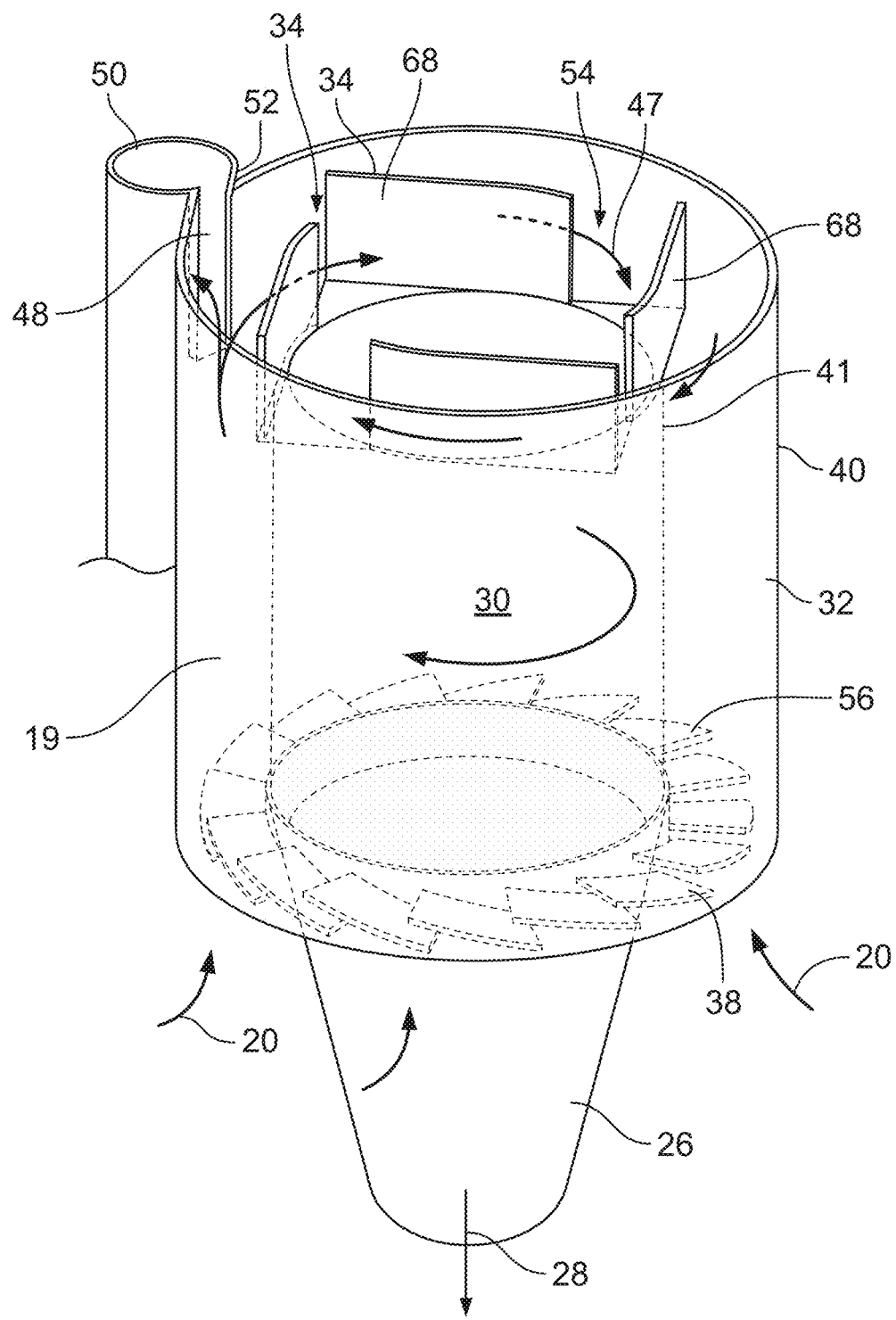
Figure 11:
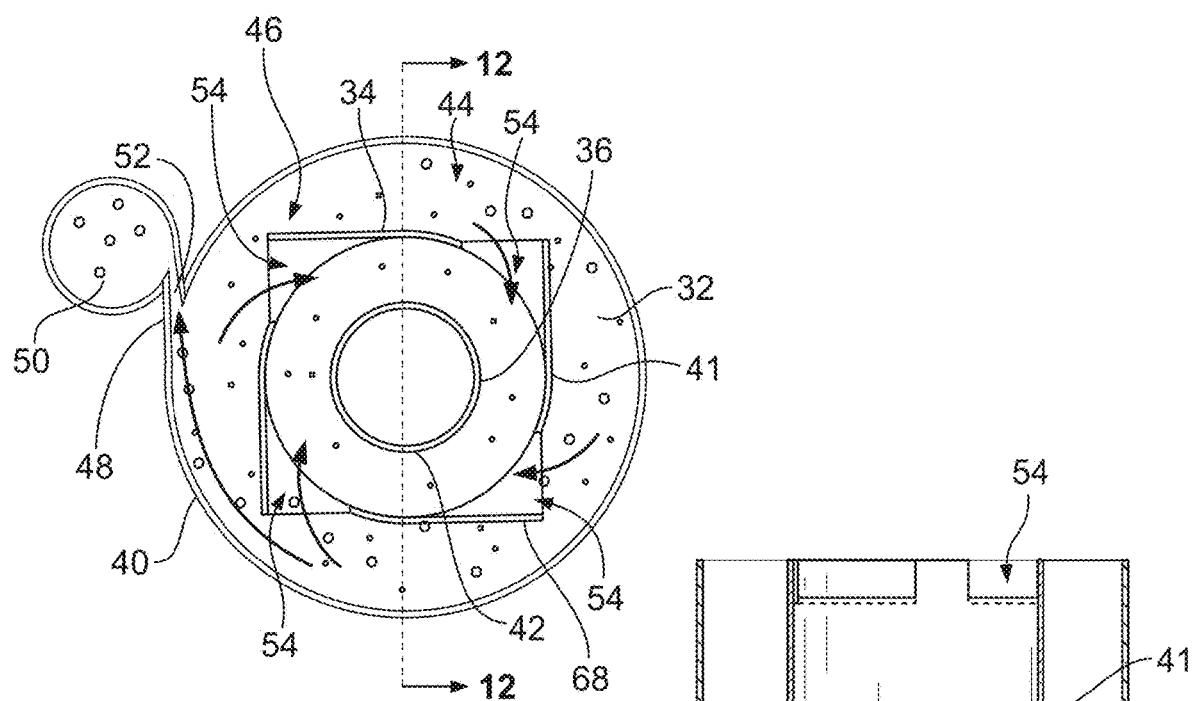
Figure 12:
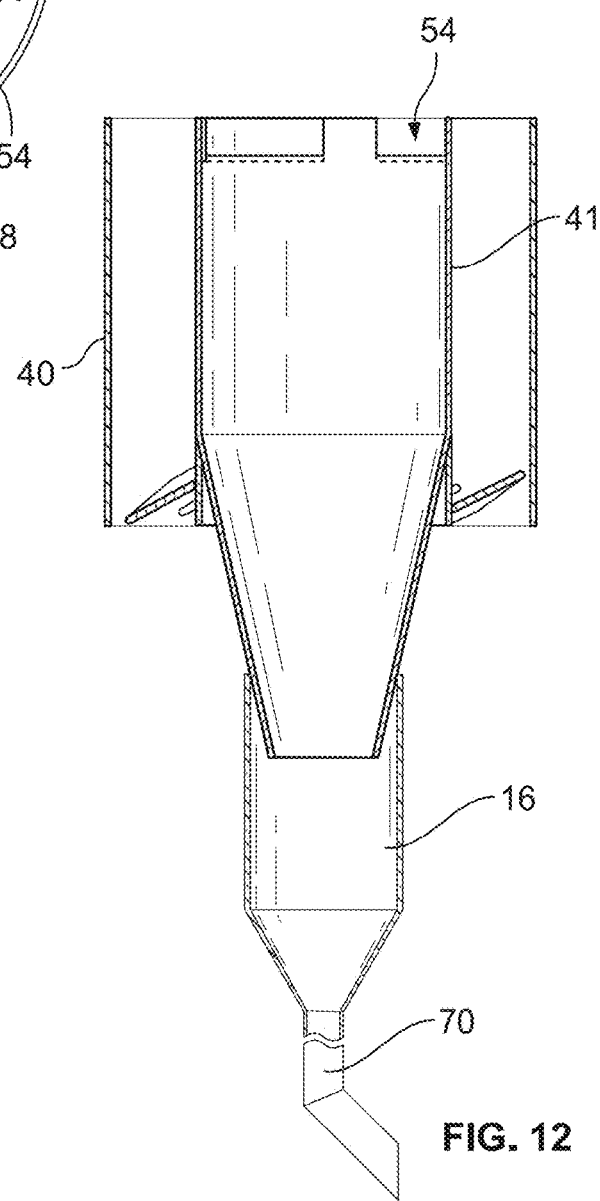
Figure 13:
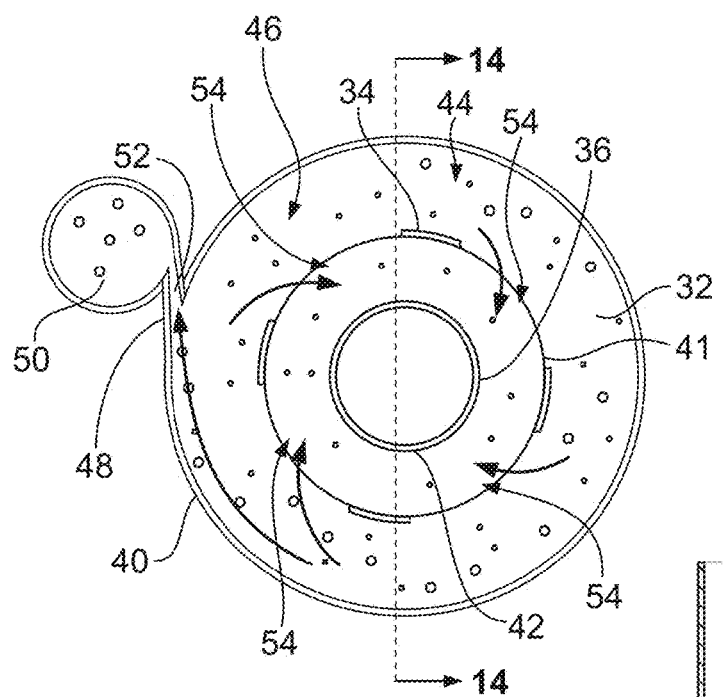
Figure 14:
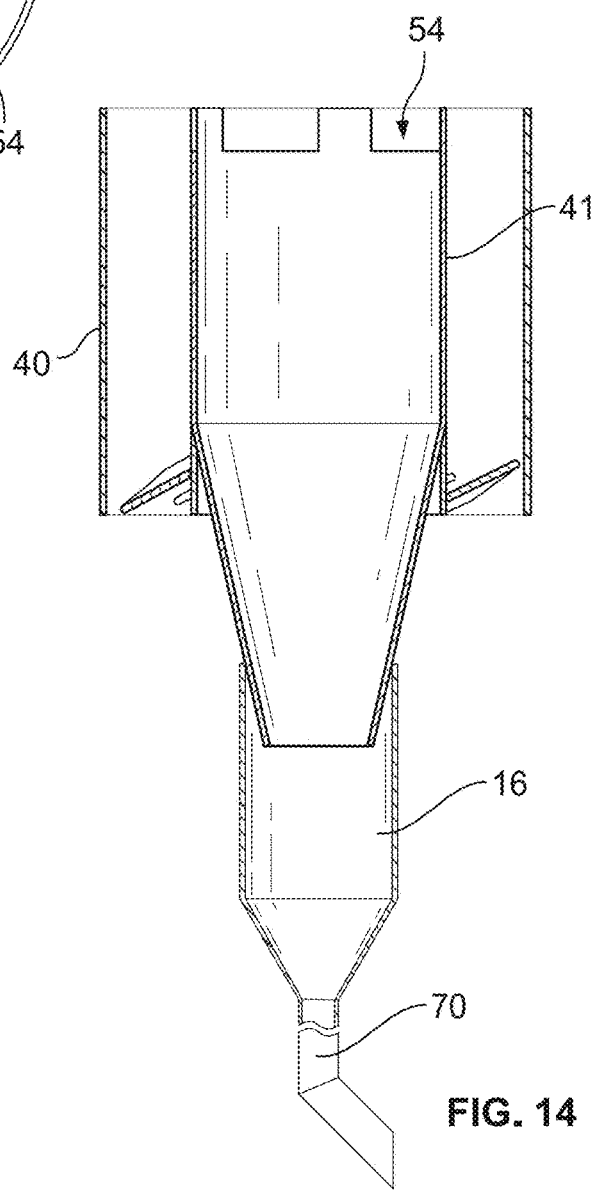
Figure 15:
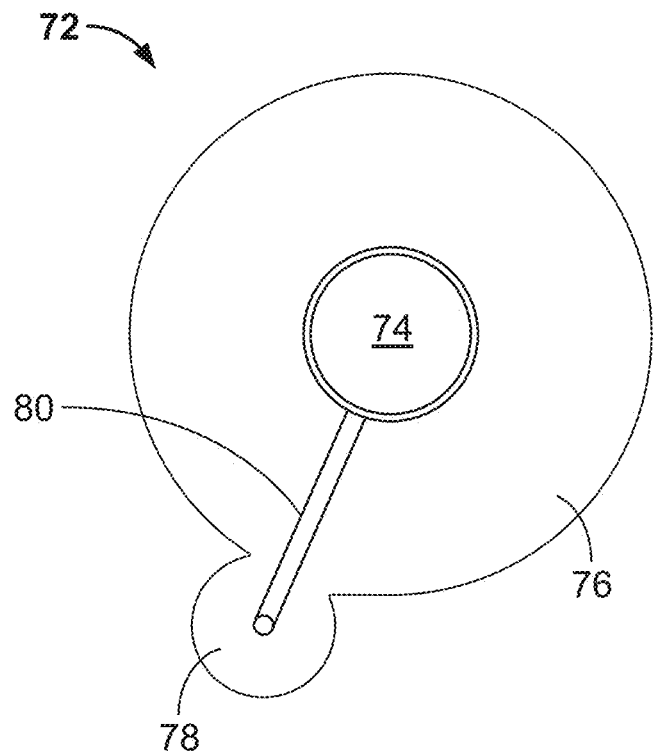
Figure 16:
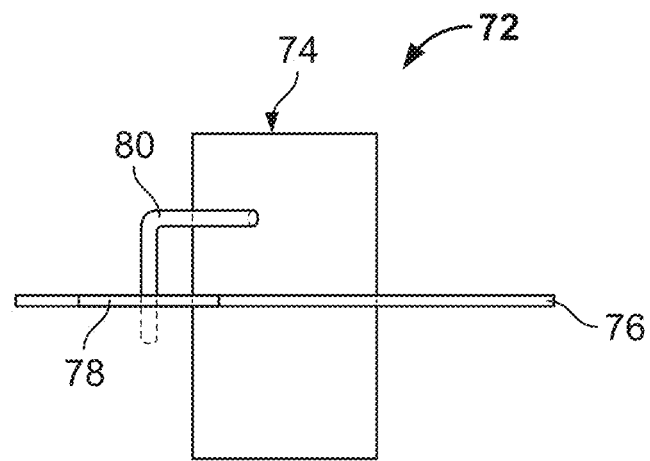
Figure 17:
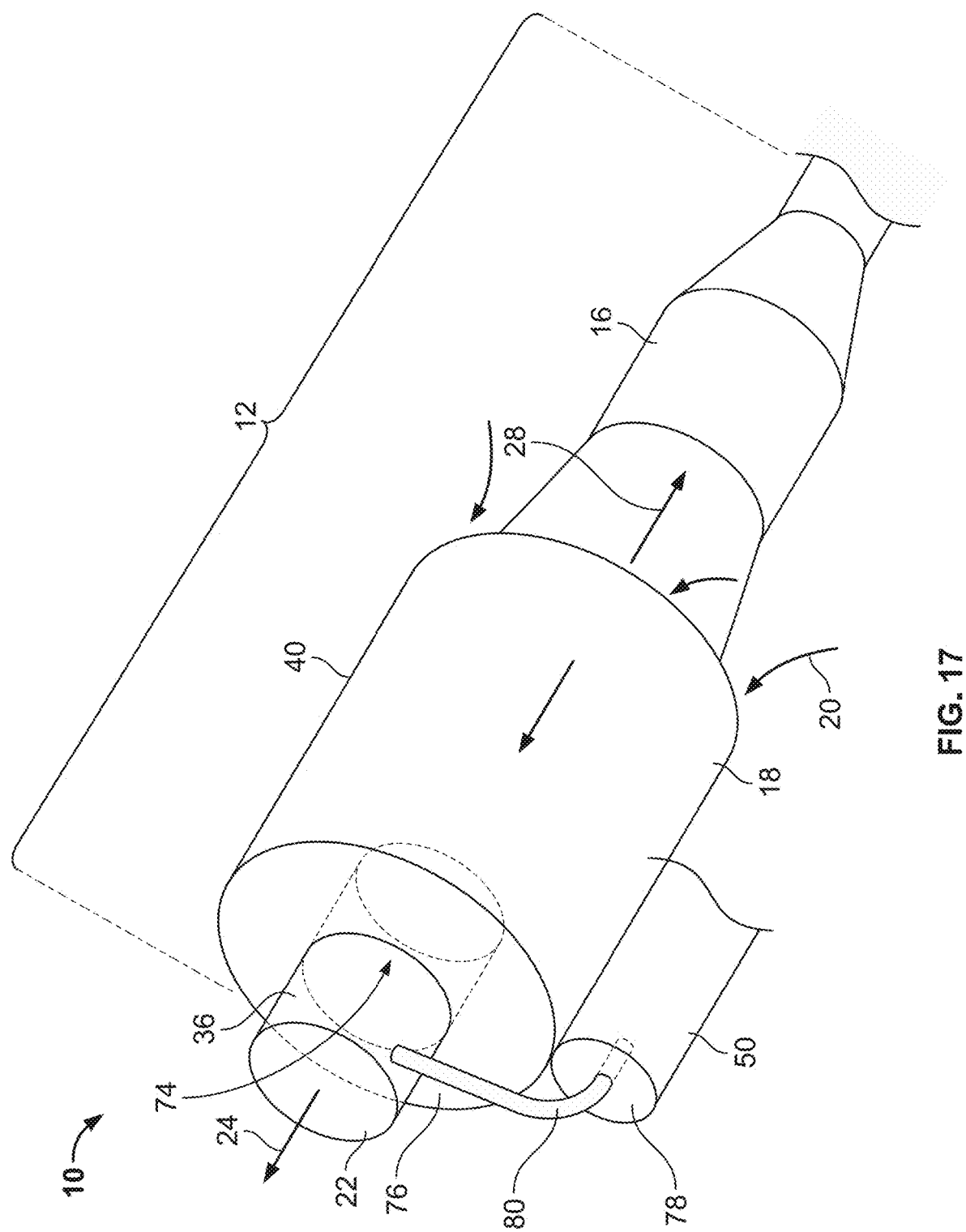
Figure 18:
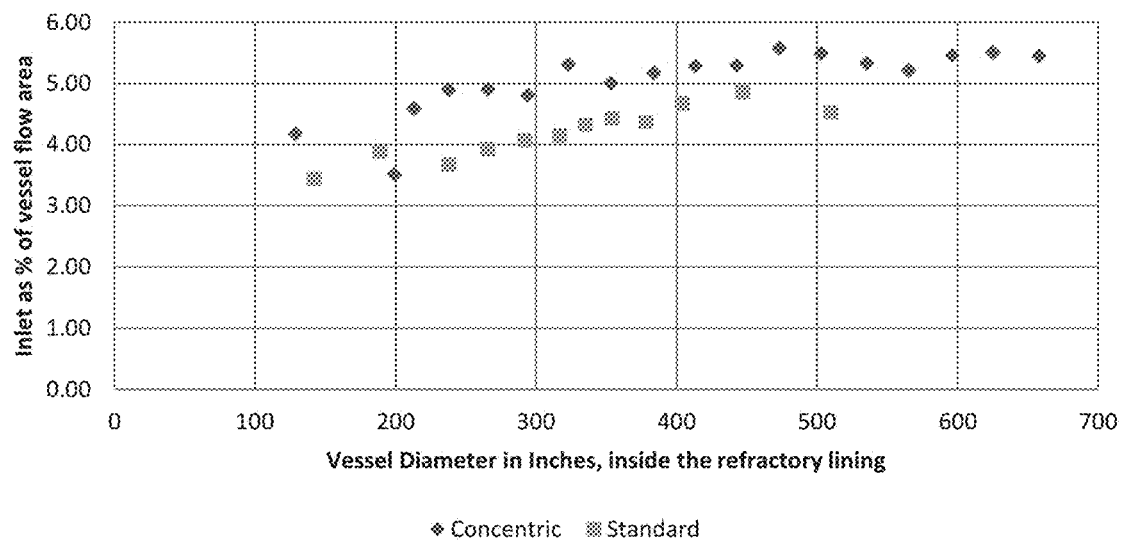

FIG. 7 PRIOR ART is a top view of the arrangement of prior art cyclone separators arranged in parallel to create two stages and separation and assembled in an assembly;

FIG. 8 is a top view of one embodiment of a dual stage cyclone separator assembly comprising more than two dual stage cyclone separators;

FIG. 9 is a top perspective view of one embodiment of a centrifugal accelerator;

FIG. 10 is a top perspective view of one embodiment of a dual stage cyclone separator;

FIG. 11 is a top view of the embodiment of the dual stage cyclone separator of FIG. 10;

FIG. 12 is a side view of the embodiment of the dual stage cyclone separator of FIG. 10;

FIG. 13 is a top view of one embodiment of a dual stage cyclone separator;

FIG. 14 is a side view of the embodiment of the dual stage cyclone separator of FIG. 13;

FIG. 15 is a top view of one embodiment of a top for a dual stage cyclone separator;

FIG. 16 is a side view of the embodiment of the cap for a dual stage cyclone separator of FIG. 15;

FIG. 17 is a top perspective view of one embodiment of a dual stage cyclone separator comprising a cap; and FIG. 18 is a graph comparing the inlet area for a Dual Stage Cyclone Separator Assembly Vessel vs Prior Art Cyclone Assembly Vessel.

V. DETAILED DESCRIPTION

The following detailed description is merely exemplary in nature and is not intended to limit the disclosure or the application and uses of the disclosure. There is no intention to be bound by any theory presented in the preceding background or the following detailed description. Further, any measurement or quantified value or range of values is not to be limited to integers. All ranges include the fractions of numbers between the integers, and every number, whole or partial, in the range.

Dual stage cyclone separators and dual stage cyclone separator assemblies for separating gas and entrained particles from a particle-contaminated gas stream are provided herein. The dual stage cyclone separator 10 and dual stage cyclone separator assembly 60 can be used in fluid catalytic cracking (FCC) processes, for separating catalyst fines from regenerator flue gas. However, the dual stage cyclone separator 10 and dual stage cyclone separator assembly 60 provided herein may be employed to separate particles from a broad range of particle-contaminated gas streams. For example, in addition to use in FCC processes, and without intending to be limiting, the dual stage cyclone separator 10 and dual stage cyclone separator assembly 60 may be used in other solid catalyst fluidized bed processes, coal fired heaters, power plants, or to separate particles from any gas stream to collect the particles for disposal or reuse.

Generally, this disclosure teaches a dual stage cyclone separator comprising two stages for separating entrained particles in a gas stream. The two stages take place inside one vessel and utilize one vortex to separate large and small particles from a contaminated or dirty gas stream.

As an overview of the present disclosure, gas with entrained particles, or a particle contaminated gas stream, flows upward from a separator inlet. The particle-contaminated gas stream can comprise large and small particles and enters the dual stage cyclone vessel in an upward direction through an annular space created by the inner wall of the outer cyclone and the outer wall of the inner cyclone and/or cone. Near the top of the cone, the particle-contaminated gas stream can encounter a centrifugal accelerator, such as, but not limited to, a vane, that converts the flow from upward to rotational, typically clockwise, with a pitch of 8° and 20°, but can be angled at any angle therebetween including fractions thereof, such as 8 degrees, 9 degrees, 10 degrees, 11 degrees, 12 degrees, 13 degrees, 14 degrees, 15 degrees, 16 degrees, 17 degrees, 18 degrees, 19 degrees, 20 degrees, or combinations thereof, upward to the horizon. The vane accelerates the velocity of the particle-contaminated gas stream, and the flow rate can be 60 fps to 70 fps or any whole or fractional fps therebetween, and can be around 59 fps, 60 fps, 61 fps, 62, fps, 63 fps, 64 fps, 65 fps, 66 fps, 67 fps, 68 fps, 69 fps, 70 fps, 71 fps, or combinations thereof. The particle-contaminated gas stream enters the primary vortex and revolves around the annular space, making at least 2 revolutions, 2.5 revolutions, 3 revolutions, or combinations thereof, before entering the secondary vortex. Near the top of the primary cyclone barrel, centrifugal forces move the large particles to the outer wall, and the large particles can exit the primary cyclone barrel thorough the SEP (solids extraction port), which can be tangentially situated in relation to the outer cyclone wall.

As an overview of one embodiment, semi-clean gas stream can exit the outer cyclone barrel, is accelerated to 70 fps to 80 fps, or to any incremental fps therebetween, i.e., 71 fps, 72 fps, 73 fps, 74 fps, 75 fps, 76 fps, 77 fps, 78 fps, 79 fps, or 80 fps, the increments do not have be integers and can comprise fractional values, because of the pressure drop, and enters the secondary cyclone barrel through a variety of ways, discussed in detail below. The semi-cleaned gas stream (now containing mostly small particles) remains rotating in a clockwise direction but now flows in downward. As the vortex comprising the semi-cleaned gas stream proceeds down the secondary cyclone, the small particles are removed from the semi-cleaned gas stream, leaving a clean gas stream. The clean gas stream (being substantially free of large and small particles or particles larger than 20 microns and may comprise micro particles or fines that are less than 20 microns in size) rotates clockwise but moves upward in direction. The clean gas stream exits the inner cyclone through a clean gas outlet located concentric to the inner cyclone barrel and at the top of the cyclone. The fines or small particles separated by the inner cyclone can be collected in the cone, and migrate to a dust hopper located at the bottom of the cone before proceeding to the inner cyclone dip leg.

Figure 1:
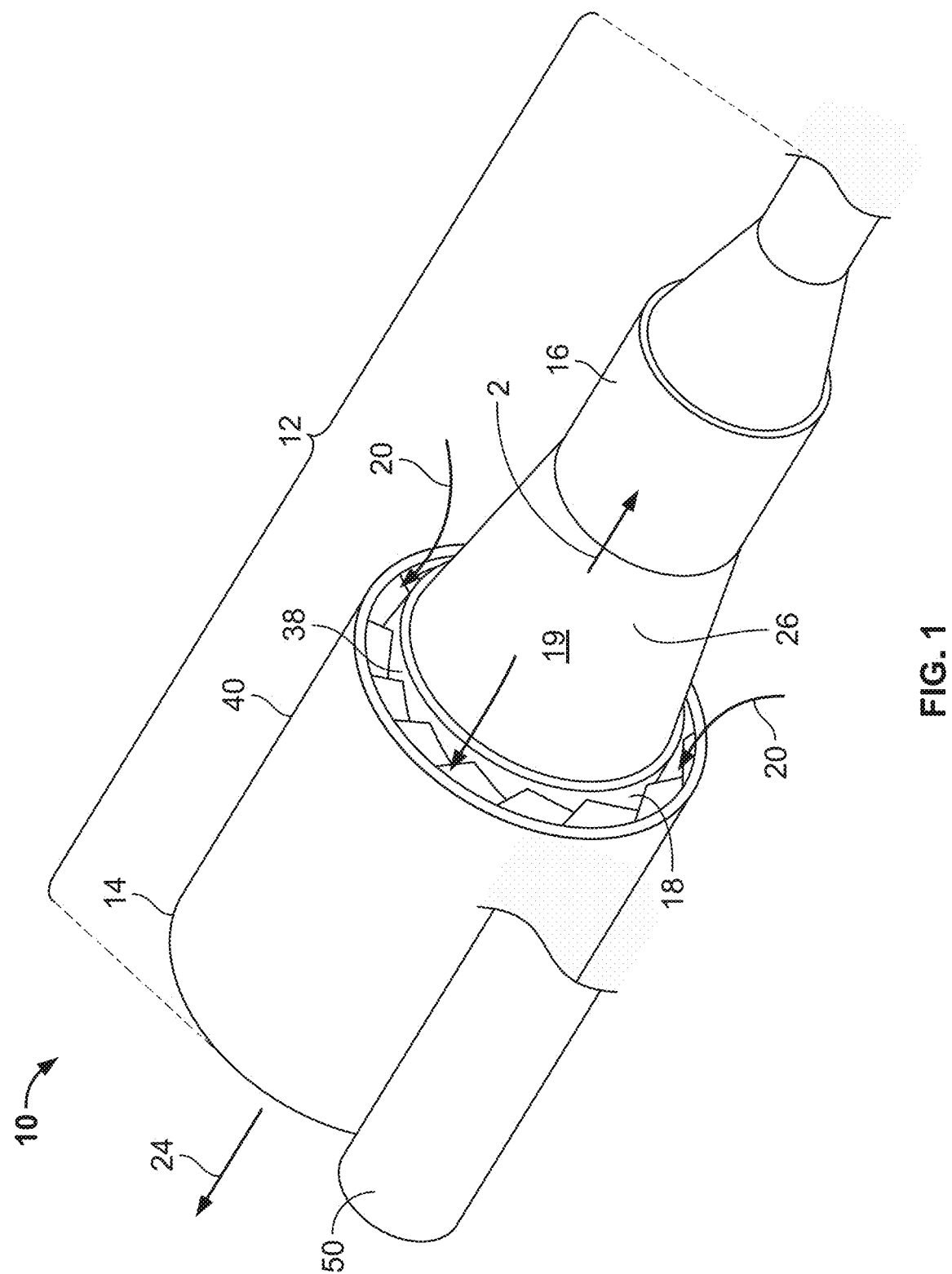
FIG. 1 is a bottom perspective view of one embodiment of a dual state cyclone separator.

Turning to FIG. 1, a bottom perspective view of one embodiment of the dual stage cyclone separator 10 is illustrated. The dual stage cyclone separator 10 comprises a main body 12. The main body 12 has an upper end 14 and a lower end 16. The main body 12 comprises a separator inlet 18 for receiving a particle-contaminated gas stream 20 that comprises gas and entrained particles. A particle-contaminated gas stream 20 may be provided from a variety of sources, such as the processes that are described above. In one particular embodiment, the particle-contaminated gas stream 20 is regenerator flue gas provided from a regenerator in a FCC process. The main body 12 also comprises a clean gas outlet 22 (see FIGS. 3 and 4) proximately located at the upper end 14 for discharging a clean gas stream 24 after particles (large and small) have been separated therefrom. The clean gas stream 24 may be fed to a turbine (not shown) to recover energy therefrom. The main body 12 also comprises a vessel particle outlet 27 (see FIG. 2) proximately located at the lower end 16 for discharging separated particles 28. The particle-contaminated gas stream 20 enters the dual stage cyclone separator 10 through an annular space 19 created by the outer wall 40 and the cone 26.

Figure 2:
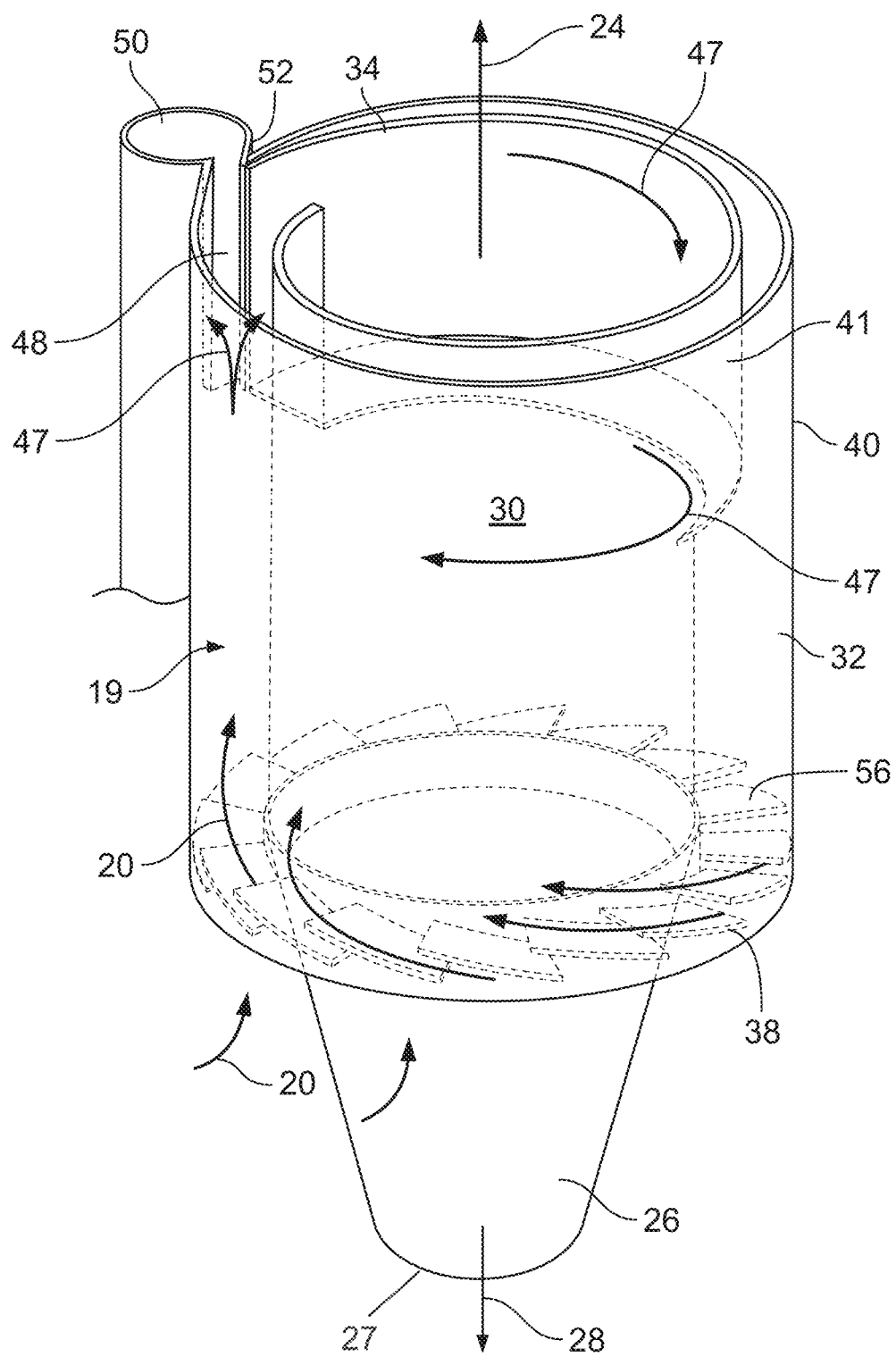
FIG. 2 is a cross-sectional view of one embodiment of a dual stage cyclone separator.

In one embodiment, as shown in FIG. 2, the dual stage cyclone separator 10 comprises a separator inlet 18 for receiving a particle-contaminated gas stream 20 that comprises gas and entrained particles. The main body 12 also comprises a clean gas outlet 22 proximately located at the upper end 14 for discharging a clean gas stream 24, after separation of the particles therefrom by the dual stage cyclone separator 10. The clean gas stream 24 is substantially free of particles, particularly particles greater than 20 microns, and may be fed to a turbine (not shown) to recover energy therefrom. The clean gas stream 24 may be fed to a third stage separator before it is fed to a turbine to recover energy therefrom. The main body 12 also comprises a cone 26 with a downwardly decreasing diameter, a vessel particle outlet 27 proximately located above the lower end 16 for discharging separated particles 28. In one embodiment, the particle-contaminated gas stream 20 may be regenerator flue gas provided from a regenerator in a FCC process, and the separated particles 28 are catalyst particles that may be recovered for further use, or that may be collected and properly disposed of. A SEP (solids extraction port see FIG. 2) 48 is tangentially connected to the outer wall 40 and collects large particles separated from the particle-contaminated gas stream 20.

Figure 5:
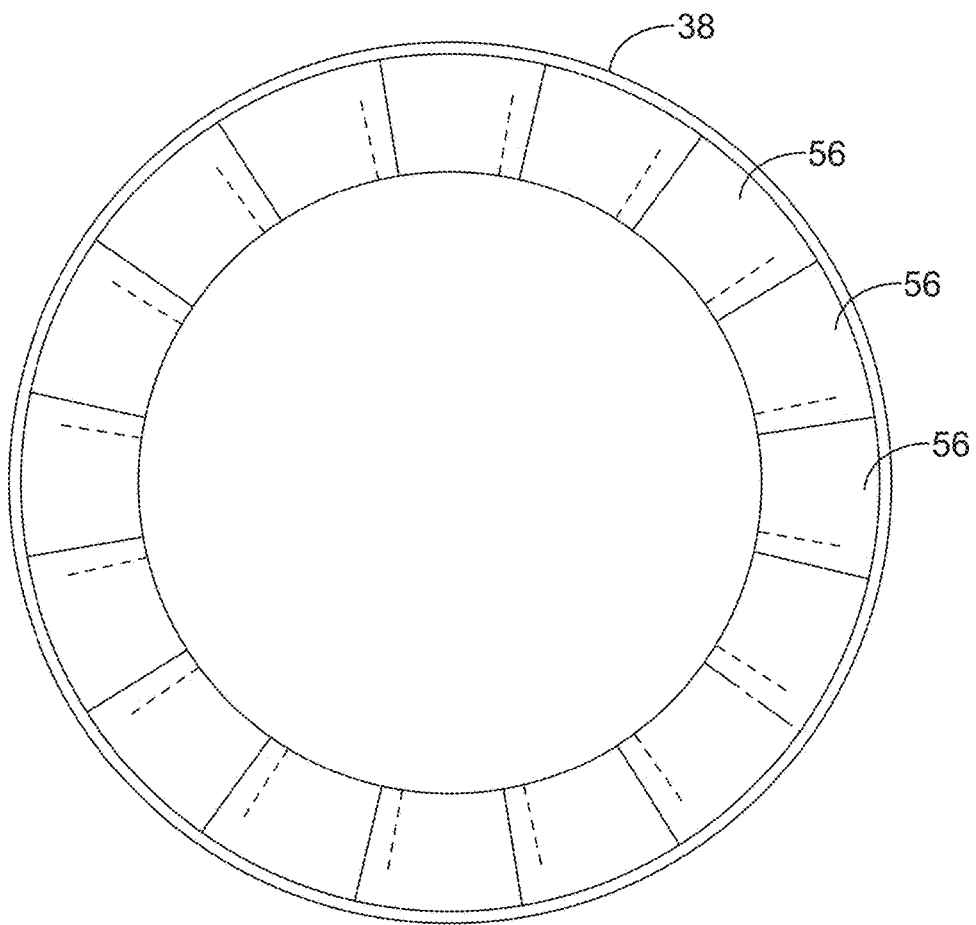
FIG. 5 is a top view of one embodiment of a centrifugal accelerator
Figure 6:
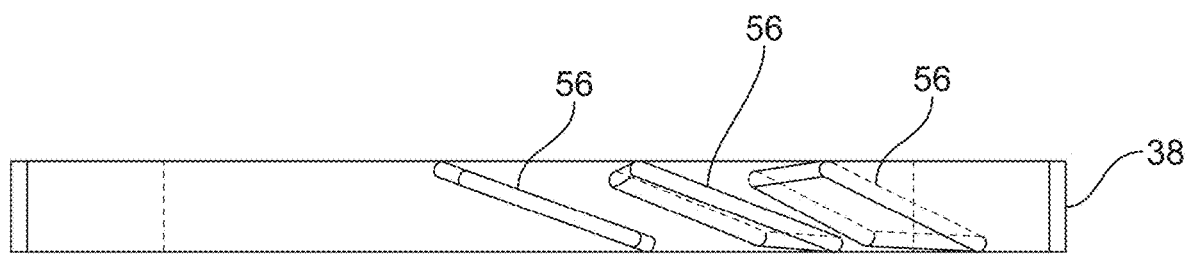
FIG. 6 is a side view of one embodiment of a centrifugal accelerator.

The main body 12 comprises a primary cyclone barrel 32, an annular space 19, and a secondary cyclone barrel 34. The particle-contaminated gas stream 20 tangentially enters the main body 12 at separator inlet 18 and enters the primary cyclone barrel 32. The primary cyclone barrel 32 is wrapped around the secondary cyclone barrel 34, and the secondary cyclone barrel 34 is coaxial with and concentric within the primary cyclone barrel 32. A cyclone vortex is initiated by a centrifugal accelerator 38 located proximate to annular space 19 bounded by the outer wall 40 and the cone 26, oriented perpendicular to the vertical, and produces the same inlet width and the same cumulative outlet area as a vane assembly in a classic cyclone inlet. The centrifugal accelerator 38 can be any device or combination of devices that induces the centrifugal acceleration of the particle-contaminated gas stream 20 within the main body 12. For example, as shown in FIGS. 5, 6, and 9, the centrifugal accelerator 38 can comprise a swirl vane that induces centrifugal acceleration of the particle-contaminated gas stream 20. As another example, jets (not shown) may be used to induce centrifugal acceleration of the particle-contaminated gas stream 20. Centrifugal acceleration of the particle-contaminated gas stream 20 creates a vortex of the particle-contaminated gas stream 20 within the primary cyclone barrel 32 and secondary cyclone barrel 34 that are housed inside the main body 12. The particle-contaminated gas stream can rotate clockwise and does not change rotational direction when entering the secondary cyclone barrel from the primary cyclone barrel 32.

The clean gas exit 36 is vertically oriented within the main body 12. The upper end 14 of the main body also comprises an outer wall 40. The entrained particles in the particle-contaminated gas stream 20 and flow through a path that is generally tangential to the outer wall 40 of the main body 12. The entrained particles vary in size, and the large particles 49 will separate from the particle-contaminated gas stream 20 in a primary vortex 44 (see FIGS. 3 and 4) and flow along the outer wall 40. The outer wall 40 defines the outer wall of the primary cyclone barrel 32. The upper end 14 further comprises a barrel wall 41, which defines the inner wall of the primary cyclone barrel 32 and the outer wall of the secondary cyclone barrel 34 and secondary vortex 46. The large particles 49 will exit the primary cyclone barrel 32 through a SEP 48 and into a large particle collection container 50 through duct 52. The small particles 51 (see FIGS. 3 and 4) will stay mixed with the gas in a semi-cleaned gas stream 47 and flow from the primary cyclone barrel 32 into the secondary cyclone barrel 34 though the secondary cyclone inlet 54.

In one embodiment of the present disclosure, the secondary cyclone inlet 54 is a volute comprising an inner edge 55 and an outer edge 57. The primary cyclone barrel 32 is in fluid communication with the secondary cyclone inlet 54. The secondary cyclone inlet 54 is in fluid communication with the secondary cyclone barrel 34. The semi-cleaned gas stream 47 comprises small particles 51 (see FIGS. 3 and 4) and enters the secondary cyclone barrel 34 and secondary vortex 46. Most of the small particles 51 (see FIGS. 3 and 4) flow along the inside of the barrel wall 41 in a downward path.

The duct 52 tangentially connects the large particle collection container 50, which can be a dust hopper, to the SEP 48 to the main body 12. The large particle collection container 50 is a length of pipe that allows the transport gas to further disengage and the large particles 49 to settle to the bottom of the large particle collection container 50.

Figure 3:
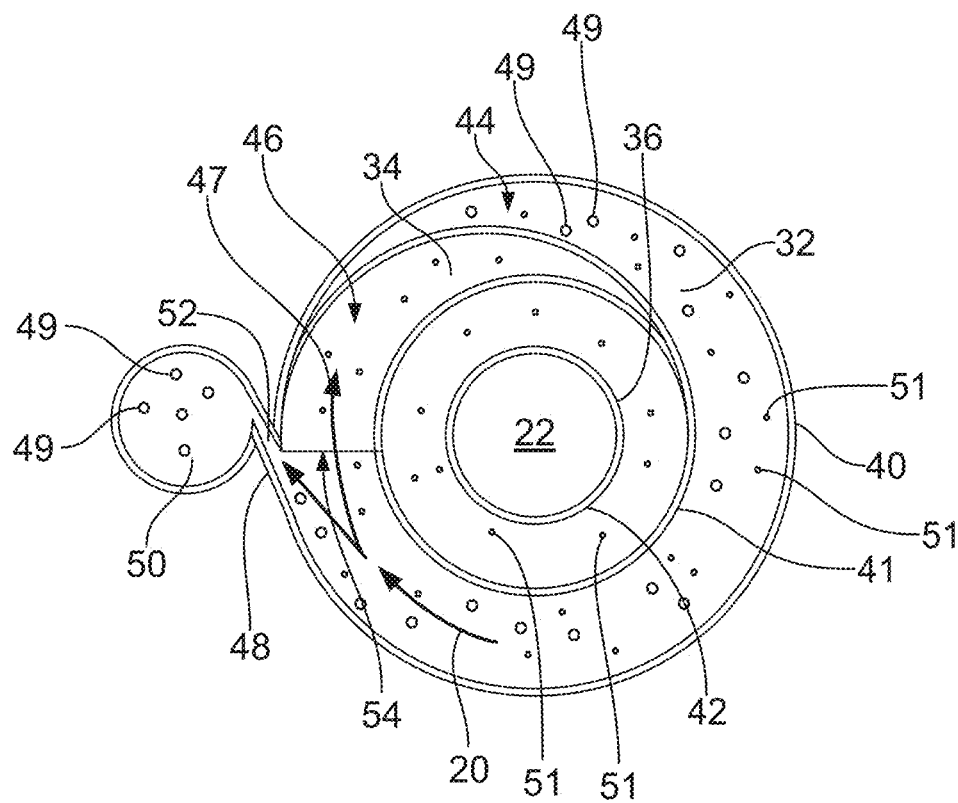
FIG. 3 is a top view of one embodiment of a dual stage cyclone separator comprising a solids extraction port ("SEP")

Turning to FIG. 3, a top view of the dual stage cyclone separator 10 can be seen. Formation of a primary vortex 44 within the primary cyclone barrel 32 and a secondary vortex 46 within the secondary cyclone barrel 34, and the associated centrifugal acceleration that is induced by the centrifugal accelerator 38 (see FIG. 2), enables particle separation due to migration of large particles toward the outer edges of the primary vortex 44, with gas and small particles 51 migrating toward the center of the primary vortex 44 to enter the secondary vortex 46.

As one example of a typical operation, though this disclosure should not be limited to this example because one having ordinary skill in the art would know there are other examples of typical operations that would work with this disclosure, a mixture of gas and particles entrained in the gas leaves the reactor riser (not shown) and the particle-contaminated gas stream 20 (not shown) is drawn into the separator inlet 18 (see FIG. 1) which opens into the primary cyclone barrel 32. The particle-contaminated gas stream 20 (not shown) enters tangentially into the primary cyclone barrel located at the upper end 14 of the main body 12. As a result, there is a swirling mixture within the primary cyclone barrel 32, and large particles 49 entrained in the particle-contaminated gas stream 20 are separated from the particle-contaminated gas stream 20 in the primary cyclone barrel 32, and the large particles 49 exit the primary cyclone barrel 32 through a solids extraction port ("SEP") 48 tangential to the primary cyclone barrel 32. The large particles 49 are collected in a large particle collection container 50. The SEP 48 marks the inlet to the secondary cyclone barrel 34, secondary vortex 46, and the exit of the primary vortex 44. The SEP 48 is a tangential outlet that starts between 45° and 0° before the secondary vortex 46. In one embodiment, the SEP 48 can end at the same point that the secondary cyclone barrel 34 meets the outer wall 40.

The SEP 48 height can be at least 75% to 125% of the height of the secondary inlet, the top of which is the same height as the secondary cyclone barrel inlet. The width of the SEP 48 can be as narrow as ¼ inch, as wide as 4 inches, or any measurement therebetween. The SEP 48 must be wide enough to allow the solids to exit before the secondary cyclone inlet 54 draws them in but narrow enough to limit the amount of gas that could escape through it. The SEP 48 is in fluid communication with a large particle collection container 50, which can be a dust hopper, through a duct 52. The large particle collection container 50, such as a dust hopper comprising a dip leg, can deliver the collected solids to the fluidized bed or to an appropriate disposal vessel. The duct 52 can comprise the same dimensions as the SEP 48, or the duct 52 can be enlarged, sloped, curved, or combinations thereof, once the duct 52 to enhance solids flow.

After the large particles 49 have exited the primary cyclone barrel 32 through the SEP 48, the semi-cleaned gas stream 47 and small particles 51 exit the primary cyclone barrel 32 through the secondary cyclone inlet 54. In one embodiment, the secondary cyclone inlet 54 can be a volute that forms the secondary vortex 46 with downward flow inside the secondary cyclone barrel 34. The small particles 51 migrate to the barrel wall 41 of the secondary cyclone barrel 34 and move downward in spiral to the cone 26 (see FIG. 1). Large particles are particles greater than 70 microns to 90 microns, though typically 75 microns. Small particles are particles smaller than 70 microns to 90 microns, though can be around 75 microns.

The small particles 51 are removed from the semi-cleaned gas stream 47 through the secondary cyclone barrel 34 and secondary vortex 46. A clean gas stream, still rotating clockwise, is drawn into the upper end 14 of the main body 12 and exits the dual stage cyclone separator. 10 through the clean gas outlet 22.

Pressure Drop.

The pressure drop through standard cyclones is determined by: 1) gas acceleration into the cyclone; 2) solids or particle acceleration into the cyclone; 3) barrel frictional loss; 4) reversal of flow loss; and 5) exit contraction loss as gas enters the clean gas outlet tube. For two stage cyclones, there are a total of 10 factors that contribute to pressure drop. The concentric cyclone configuration of the present disclosure eliminates factors 4 and 5 from the first stage, which is defined by the primary cyclone barrel 32 and primary vortex 44. The reduction of the number of factors for predicting pressure drop through the dual stage cyclone separator 10 will then be less than for the standard cyclones.

Figure 4:
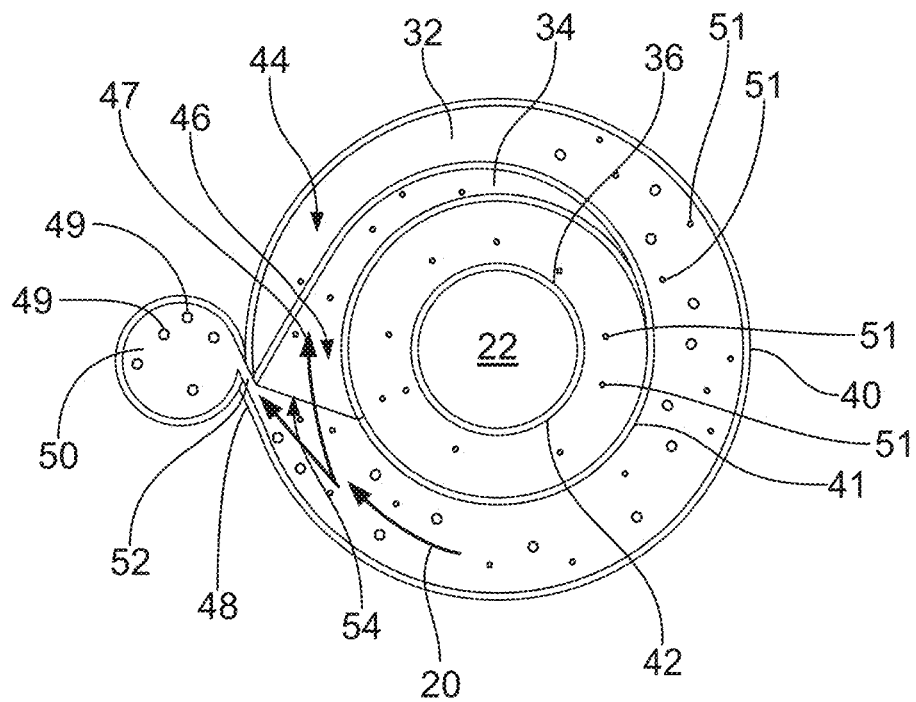
FIG. 4 is a top view of another embodiment of a dual stage cyclone separator comprising a SEP.

Turning to FIG. 4, a top view of another embodiment of the dual stage cyclone separator 10 can be seen. The duct 52, SEP 48, and secondary cyclone inlet 54 comprise different dimensions than the embodiment illustrated in FIG. 3. The secondary cyclone inlet 54 can be a volute in this embodiment.

Turning to FIG. 5, the centrifugal accelerator 38 comprises a swirl imparting means, which can be in the form of swirl vanes 56. The centrifugal accelerator 38 will impart a swirling motion on the particle-contaminated gas stream 20 (not shown), and in this way, initial separation of large particles 49 (not shown) is effected, and the small particle 51 (not shown) separation takes place as the semi-cleaned gas stream 47 descends into the secondary cyclone barrel 34.

Suitably the centrifugal accelerator 38 can be so arranged that the direction of rotation which it imparts is the same as the direction of rotation of particle-contaminated gas stream 20 (not shown) entering the dual stage cyclone separator 10 so that the latter swirl is amplified which further improves the overall separation efficiency. The rotational direction can be clockwise or counterclockwise. The number and size of the swirl vanes 56 can vary depending of the size of the dual stage cyclone separator 10. FIG. 6 shows 16 vanes for exemplary purposes only and this disclosure is not to be limited to a centrifugal accelerator 38 comprising 16 swirl vanes. It would be known to one having ordinary skill in the art that having fewer swirl vanes will result in longer vanes and therefore, a heavier assembly. One having ordinary skill in the art will be able to optimize the mechanical design of the centrifugal accelerator 38 for weight and other important factors.

Turning to FIG. 6, a side view of another embodiment of a centrifugal accelerator 38 can be seen. A swirl vane type accelerator can be used. The swirl vanes 56 can be aligned at any angle between 8° and 20°, including non-integer angles, a 9 degree, 10 degree, 11 degree, 12 degree, 13 degree, 14 degree, 15 degree, 16 degree, 17 degree, 18 degree, 19 degree, 20 degree, or combinations thereof, 16 vanes and 1.25" thickness but one having ordinary skill in the art can adjust vane thickness, angle, and number of vanes to meet the desired area criteria. The desired criteria could include vane overlap requirements, number of vanes employed, and mitigating solids impinging upon the blades will eventually wear them away. One having ordinary skill in the art would understand how to design a swirl vane accelerator to meet desired criteria.

Turning now to FIG. 7, a top view of a prior art dual cyclone assembly is illustrated. The prior art dual cyclone assembly comprises single cyclone vessels in tandem or parallel to create a dual cyclone vessel, and the dual cyclone vessels are arranged in an assembly. The parallel or tandem arrangement of single cyclones to create dual cyclones takes up valuable space when they are arranged in an assembly and reduces the number of dual cyclones that can be incorporated into the assembly.

TABLE 1

Prior Art Number of Cyclones in an Assembly Vessel

| No of Cyclones | | | | Refra ID, in | Vssl ID, in | Flow A ft² | Inlet A Each, ft² | Inlet A total, ft² | Vsl/ Inlet | Inlet/ Vs % |
|---|---|---|---|---|---|---|---|---|---|---|
| Row 1 | Row 2 | Row 3 | total | | | | | | | |
| 1 | 0 | 0 | 1 | 142 | | 109.9776 | 3.784 | 3.784 | 29.063 | 3.441 |
| 2 | 0 | 0 | 2 | 189 | | 194.8278 | 3.784 | 7.568 | 25.744 | 3.884 |
| 3 | 0 | 0 | 3 | 238 | | 308.9451 | 3.784 | 11.352 | 27.215 | 3.674 |
| 4 | 0 | 0 | 4 | 266 | | 385.9141 | 3.784 | 15.136 | 25.496 | 3.922 |
| 5 | 0 | 0 | 5 | 292 | | 465.043 | 3.784 | 18.92 | 24.579 | 4.0684 |
| 6 | 0 | 0 | 6 | 317 | | 548.0825 | 3.784 | 22.704 | 24.140 | 4.142 |
| 7 | 0 | 0 | 7 | 335 | | 612.0924 | 3.784 | 26.488 | 23.108 | 4.327 |
| 8 | 0 | 0 | 8 | 354 | | 683.4928 | 3.784 | 30.272 | 22.578 | 4.429 |
| 9 | 0 | 0 | 9 | 378 | | 779.3113 | 3.784 | 34.056 | 22.883 | 4.370 |
| 10 | 1 | 0 | 11 | 404 | | 890.2052 | 3.784 | 41.624 | 21.386 | 4.676 |
| 12 | 2 | 0 | 14 | 447 | | 1089.789 | 3.784 | 52.976 | 20.571 | 4.861 |
| 14 | 3 | 0 | 17 | 510 | | 1418.625 | 3.784 | 64.328 | 22.053 | 4.534 |

Turning to FIG. 8, a top view of one embodiment of a dual stage cyclone separator assembly 60 is illustrated. The dual stage cyclone separator assembly 60 can comprise a number of the dual stage cyclone separators 10 that are configured in a circular manner around the dual stage cyclone separator 10 in the center. The circular configuration of the dual stage cyclone separator 10 extends outward with increasing radii to a cyclone cluster assembly outer housing 62. The circular configuration of the dual stage cyclone separator 10 is preferred for obtaining a more efficient use of the space inside of the cyclone cluster assembly outer housing 62, although square or rectangular configurations can be used. FIG. 8 illustrates one embodiment of the dual stage cyclone separator 10 for exemplary purposes, and any embodiment of the dual stage cyclone separator 10 disclosed herein could replace the embodiment shown in FIG. 8.

TABLE 2

Dual Stage Concentric Cyclone Assembly Vessel

| No of Cyclones | | | | Refra ID, in | Vssl ID, in | Flow A ft² | Inlet A Each, ft² | Inlet A total, ft² | | Inlet/ Vs % |
|---|---|---|---|---|---|---|---|---|---|---|
| Row 1 | Row 2 | Row 3 | total | | | | | | Vsl/Inlet | |
| 1 | 0 | 0 | 1 | 129 | 139 | 90.76 | 3.784 | 3.78 | 23.99 | 4.17 |
| 2 | 0 | 0 | 2 | 199 | 209 | 215.99 | 3.784 | 7.57 | 28.54 | 3.50 |
| 3 | 0 | 0 | 3 | 213 | 223 | 247.45 | 3.784 | 11.35 | 21.80 | 4.59 |
| 4 | 0 | 0 | 4 | 238 | 248 | 308.95 | 3.784 | 15.14 | 20.41 | 4.90 |
| 5 | 0 | 0 | 5 | 266 | 276 | 385.91 | 3.784 | 18.92 | 20.40 | 4.90 |
| 6 | 0 | 0 | 6 | 294 | 304 | 471.44 | 3.784 | 22.70 | 20.76 | 4.82 |
| 7 | 1 | 0 | 8 | 323 | 333 | 569.03 | 3.784 | 30.27 | 18.80 | 5.32 |
| 8 | 1 | 0 | 9 | 353 | 363 | 679.64 | 3.784 | 34.06 | 19.96 | 5.01 |
| 9 | 2 | 0 | 11 | 384 | 394 | 804.25 | 3.784 | 41.62 | 19.32 | 5.18 |
| 10 | 3 | 0 | 13 | 413 | 423 | 930.31 | 3.784 | 49.19 | 18.91 | 5.29 |
| 11 | 4 | 0 | 15 | 443 | 453 | 1070.37 | 3.784 | 56.76 | 18.86 | 5.30 |
| 12 | 6 | 0 | 18 | 473 | 483 | 1220.25 | 3.784 | 68.11 | 17.92 | 5.58 |
| 13 | 6 | 1 | 20 | 503 | 513 | 1379.95 | 3.784 | 75.68 | 18.23 | 5.48 |
| 14 | 7 | 1 | 22 | 535 | 545 | 1561.12 | 3.784 | 83.25 | 18.75 | 5.33 |
| 15 | 8 | 1 | 24 | 565 | 575 | 1741.10 | 3.784 | 90.82 | 19.17 | 5.22 |
| 16 | 9 | 3 | 28 | 596 | 606 | 1937.40 | 3.784 | 105.95 | 18.29 | 5.47 |
| 17 | 10 | 4 | 31 | 625 | 635 | 2130.53 | 3.784 | 117.30 | 18.16 | 5.51 |
| 18 | 11 | 5 | 34 | 658 | 668 | 2361.45 | 3.784 | 128.66 | 18.35 | 5.45 |

See FIG. 18 for a graph depicting the total cyclone inlet area for No. 55 cyclones as % of vessel flow area for Dual Stage Cyclone Separator Assembly Vessel vs Prior Art Cyclone Assembly Vessel.

Turning now to FIG. 9, a perspective view of one embodiment of a centrifugal accelerator 38 is illustrated. The centrifugal accelerator 38 in this embodiment is a vane comprising swirl vanes 56 for converting an upward flow of particle-contaminated gas stream 20 (not shown) to a rotational flow.

Turning now to FIG. 10, another embodiment of the dual stage cyclone separator 10 is shown. The movement and/or path of the particle-contaminated gas stream 20, large particles 49, small particles 51, semi-cleaned gas stream 47, and clean gas stream 24, (see FIGS. 2-4 for 20, 24, 47, 49, and 51) through this embodiment of the dual stage cyclone separator 10 is similar to the movement described in FIGS. 2-4. Any material differences said movement and/or path are discussed below. The dual stage cyclone separator 10 comprises a primary cyclone barrel 32, a secondary cyclone barrel 34, an outer wall 40, and barrel wall 41. The dual stage cyclone separator 10 can be made of approximately ½-inch steel and lined with approximately ¾-inch concrete abrasion resistant lining, though this disclosure is not limited to these parameters. The dual stage cyclone separator 10 can be made of any material that would be suitable for its operation and lined, or not lined, with an abrasion resistant material. The secondary cyclone barrel 34 comprises at least one secondary cyclone inlet 54. The secondary cyclone barrel 34 is fixed to a cone 26 extending downwardly from the periphery or circumference of the secondary cyclone barrel 34, and decreases the diameter of the secondary cyclone barrel 34 to a diameter between 40 degrees and 80 degrees, 50 degrees and 70 degrees, 55 degrees and 65 degrees, and/or 60 degrees The cone 26 is fixed to a dip leg 70 (see FIGS. 12 and 14) that is approximately 12 inches to 20 inches, approximately 13 inches to 17 inches, or approximately 14 inches to 15 inches in length, and terminates at the same elevation as the secondary cyclone. A trickle valve (not shown) may be installed at a distal end or exit end of the dip leg 64. A cap 72 (see FIGS. 15-17) can be used to cap the dual stage cyclone separator assembly 60. The cap 72 will become the cap wall of the SEP 48 and duct 52 that connect the large particle collection container 50 to the outer wall 40. The cap 72 controls the flow of the semi-clean gas stream form the primary cyclone barrel to the secondary cyclone and to the outlet tube. The cap 72 can also be a support mechanism which transmits the weight of the various components to the clean gas outlet 22 and ultimately to a vessel plenum chamber (not shown). In an FCCU application and in other industrial applications, the dip leg 70 and the dip leg attached to the large particle collection container 50, if one is attached, can be 20 feet long or longer. The length of the dip leg 70, and the dip leg attached to the large particle collection container 50, is determined by the need to produce a fluidized head (density×height) sufficient to overcome the cyclone pressure drop and allow the fluidized catalyst to flow from the lower pressure zone post SEP 48 back into the higher pressure zone at the apparatus entrance.

Turning to FIG. 11, a top view of FIG. 10 is illustrated. The secondary cyclone barrel 34 comprises at least one secondary cyclone inlet 54 that is not a volute. The secondary cyclone inlet can be a slot or an opening in the barrel wall 41. If desired, the semi-cleaned gas stream 47 can be guided into the at least one secondary cyclone inlet 54 by at least one guide 68. If desired, at least one guide 68 can be placed at one or more of the secondary cyclone inlets 54. It would be known to those skilled in the art that placing the addition of at least one guide 68 may cause turbulence. The at least one guide 68 does not have to be placed at each of the one or more secondary cyclone inlets 54. The at least one guide 68 can be seated in such a position as to collect the semi-cleaned gas stream 47 flowing toward it and direct the semi-cleaned gas stream 47 toward the inner wall of the secondary cyclone barrel 34.

Turning to FIG. 12, a side view of the dual stage cyclone separator 10 of FIG. 11, is shown. The outer wall 40 and a barrel wall 41 can be seen. One secondary cyclone inlet 54 is illustrated for exemplary purposes, and this disclosure should not be limited to a specific number of secondary cyclone inlets 54. A dip leg 70 can be attached to the lower end for funneling the small particles 51 (not shown) out of the dual stage cyclone separator 10.

Turning to FIG. 13, another embodiment of the secondary cyclone barrel 34 is illustrated showing one secondary cyclone inlet 54. The movement and/or path of the particle-contaminated gas stream 20, large particles 49, small particles 51, and semi-cleaned gas stream 47 through this embodiment of the dual stage cyclone separator 10 is similar to the movement described in FIG. 2. This embodiment is similar to the embodiment described in FIGS. 2-6, and material differences are described below.

The secondary cyclone inlet 54 is not a volute. The number of inlets could be infinite, and the secondary cyclone inlet 54 could be a 360-degree opening, if the secondary cyclone barrel 34 could be properly supported. The height of at least one secondary cyclone inlet 54 can be reduced to ¼ of the height of the secondary cyclone inlet 54 of FIG. 2 (volute embodiment example). The purpose of the at least one secondary cyclone inlet 54 is to change the semi-cleaned gas stream 47 flow and/or vortex direction from upward to downward after entry into the secondary cyclone barrel 34. The at least one secondary cyclone inlet 54 of the present embodiment is sized to accelerate the semi-cleaned gas stream 47 from a primary stage velocity to secondary stage velocity. In the case of FCC, that is nominally 65 ft/sec in primary stage to 75 ft/sec in the second stage. The secondary cyclone inlet 54 of this embodiment does not disturb the larger particles 49 as they enter the SEP 48, the SEP 48 can be wider and shorter than the previous embodiment, which could allow "junk" particles to exit, the area for flow through the SEP 48 is reduced and there is less chance of two way traffic, turbulence that can be caused by the floor of the secondary cyclone inlet 54 in the previous embodiment is substantially reduced, overall pressure drop should be slightly reduced, and the average gas path length is closer to the average which provides for better separation.

Turning to FIG. 14, side view of the dual stage cyclone separator assembly of FIG. 13 is illustrated. The outer wall 40 and a barrel wall 41 are labeled. One secondary cyclone inlet 54 is illustrated for exemplary purposes, and this disclosure should not be limited to a specific number of secondary cyclone inlets 54. A dip leg 70 can be attached to the lower end for funneling the small particles 51 (not shown) out of the dual stage cyclone separator 10.

Turning now to FIG. 15, a top view of one embodiment of the cap 72 is shown. The cap 72 comprises a center throughbore 74 for allowing the clean gas stream 24 to exit the dual stage cyclone separator 10. The cap 72 can comprise a cyclone lid 76 and a SEP lid 78. The cap 72 may also comprise a blow-down vent 80, which can allow 0% to 5%, or any percent therebetween, such as 0%, 1%, 2%, 3%, 4%, 5%, including non-integer percents, of the total particle-contaminated gas stream 20 fed to the primary stage cyclone barrel to exit with large particles 49 through the SEP 48. If there is too much particle contaminated gas stream that enters the SEP 49, the large particles 49 can be re-entrained into the gas stream, which reduces separation efficiency. The dual stage cyclone separator does not have to have a blow-down vent 80. It can have, however, a small vent pipe installed that looks like the clean gas outlet 22 (see FIG. 2), connected to the clean gas outlet 22, and is sized to accommodate gas that disengages from the large particles 49 (see FIG. 3) or naturally flows into the small vent pipe through the SEP 48 (see FIG. 2). An alternative embodiment could comprise a critical flow nozzle (not shown) in blow-down vent 80. The amount of gas for the vent pipe or blow-down vent 80 to manage can be between 0 and 5% of the total gas that enters the primary cyclone barrel 32.

Turning now to FIG. 16, a side view of one embodiment the cap 72 is shown. The cap 72 comprises a center throughbore 74 for allowing the clean gas stream 24 to exit the dual stage cyclone separator 10. The cap 72 can comprise a cyclone lid 76 and a SEP lid 78. The cap 72 may also comprise a blow-down vent 80.

Turning now to FIG. 17, a top perspective view of the dual stage cyclone separator 10 is show with the cap 72 attached. The cap 72 can be welded or removably attached to the dual stage cyclone separator 10, as one having ordinary skill in the art would desire.

In sum, it is important to recognize that this disclosure has been written as a thorough teaching rather than as a narrow dictate or disclaimer. Reference throughout this specification to "one embodiment", "an embodiment", or "a specific embodiment" means that a particular feature, structure, or characteristic described in connection with the embodiment is included in at least one embodiment and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment may be combined in any suitable manner with one or more other embodiments. It is to be understood that other variations and modifications of the embodiments described and illustrated herein are possible in light of the teachings herein and are to be considered as part of the spirit and scope of the present subject matter.

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/Figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise. Variation from amounts specified in this teaching can be "approximately," "about," or "substantially," so as to accommodate tolerance for such as acceptable manufacturing tolerances.

The foregoing description of illustrated embodiments, including what is described in the Abstract and the Summary, and all disclosure and the implicated industrial applicability, are not intended to be exhaustive or to limit the subject matter to the precise forms disclosed herein. While specific embodiments of, and examples for, the subject matter are described herein for teaching-by-illustration purposes only, various equivalent modifications are possible within the spirit and scope of the present subject matter, as those skilled in the relevant art will recognize and appreciate. As indicated, these modifications may be made in light of the foregoing description of illustrated embodiments and are to be included, again, within the true spirit and scope of the subject matter disclosed herein.

Thus, although the foregoing disclosure has been described in some detail by way of illustration and example for purposes of clarity and understanding, it will be obvious that certain changes and modifications may be practiced within the scope of the disclosure, as limited only by the scope of claims.

I claim:

1. A dual stage cyclone separator comprising:
a cyclone body having a main body having an upper end, a lower end, a cone with a downwardly decreasing diameter extending therebetween, and a central opening located inside the upper end;
a primary stage cyclone separator and a second stage cyclone separator, wherein the second stage cyclone separator is coaxial with, concentric within, and in fluid communication with the primary stage cyclone separator;
the second stage cyclone separator having a second stage cyclone inlet;
the main body being in fluid communication with a gas inlet for receiving a particle-contaminated gas, wherein the gas inlet is located near a top of the cone;
a centrifugal accelerator to induce centrifugal acceleration of the particle-contaminated gas stream, wherein the centrifugal accelerator is fixed to the cone and located in an annular space between the cone and an outer wall;
a gas outlet for discharging a clean gas stream from the dual stage cyclone separator in fluid communication with a center portion of the main body located proximate to the upper end of the main body;
a solids extraction port, wherein a sidewall of said main body defines a solids extraction port opening located between said upper end and said lower end for discharging large particles from said cyclone body; and
a small particle discharge opening, wherein the small particle discharge opening is located at the lower end of the main body.

2. The dual stage cyclone separator of claim 1, wherein the main body defines an outer wall of the primary stage cyclone separator.

3. The dual stage cyclone separator of claim 1, wherein the centrifugal accelerator is a vane.

4. The dual stage cyclone separator of claim 3, wherein the vane is made of ½-inch steel, ¾-inch abrasion lining, or a hard surfacing material.

5. The dual stage cyclone separator of claim 1, wherein the second stage cyclone inlet is a volute comprising an inner edge and an outer edge, wherein the outer edge of the volute is situated within an inch of the sidewall.

6. The dual stage cyclone separator of claim 5, wherein the second stage cyclone inlet comprises at least one particle guide.

7. The dual stage cyclone separator of claim 1, wherein the second stage cyclone inlet is not a volute and comprises at least one opening that extends through an exterior secondary cyclone barrel wall.

8. The dual stage cyclone separator of claim 1, further comprising a dip leg attached to, and in fluid communication with, the lower end.

9. The dual stage cyclone separator of claim 1, wherein the solids extraction port comprises a dip leg that is in fluid communication with the dip leg attached to the lower end.

10. A dual stage cyclone separator assembly comprising more than 1 of the dual stage cyclone separators of claim 1.

11. A method of using the dual stage cyclone separator of claim 1, the method comprising:
separating constituents of a gas stream by using a dual stage cyclone separator comprising:
a cyclone body having a main body having an upper end, a lower end, a cone with a downwardly decreasing diameter extending therebetween, and a central opening located inside the upper end;
a primary stage cyclone barrel and a second stage cyclone barrel, wherein the second stage cyclone barrel is coaxial with and concentric within the primary stage cyclone barrel;
the second stage cyclone barrel having a second stage cyclone inlet;
the main body being in fluid communication with the gas inlet for receiving the particle-contaminated gas, wherein the gas inlet is located near the top of the cone;
a gas outlet for discharging a clean gas stream from the dual stage cyclone separator and in fluid communication with a center portion of the main body located proximate to the upper end of the main body;
a solids extraction port, wherein a sidewall of said main body defines a solids extraction port opening located between said upper end and said lower end for discharging large particles from said cyclone body; and
a small particle discharge opening, wherein the small particle discharge opening is located at the lower end of the main body.

12. The method of claim 11, wherein the gas stream is a particle-contaminated gas stream, and further comprising:
forcing the particle-contaminated gas stream into the gas inlet and through a centrifugal accelerator in a dual stage cyclone separator comprising:
inducing centrifugal acceleration of the particle-contaminated gas stream through the centrifugal accelerator, wherein the centrifugal accelerator changes the flow of the particle-contaminated gas stream from upward to rotational;
separating large particles from the particle-contaminated gas stream through the primary stage cyclone barrel, wherein the large particles exit the dual stage cyclone separator through the solids extraction port;
creating a semi-clean gas stream comprising small particles;
separating small particles from the semi-clean gas stream through the second stage cyclone, wherein the small particles exit the second stage cyclone through the cone;
creating a clean gas stream not including small particles; and
sending the clean gas stream through a clean gas outlet.

13. A dual stage cyclone separator comprising:
a cyclone body having a main body having an upper end, a lower end, a cone with a downwardly decreasing diameter extending therebetween, and a central opening located in the upper end;
a primary stage cyclone separator and a second stage cyclone separator, wherein the second stage cyclone separator is coaxial with, concentric within, and in fluid communication with the primary stage cyclone separator;
the second stage cyclone comprising a secondary cyclone barrel having an exterior secondary cyclone barrel wall and an inner secondary cyclone barrel wall;
the secondary cyclone barrel having at least one secondary cyclone inlet that is not a volute, wherein the secondary cyclone inlet is an opening that extends through the exterior secondary cyclone barrel wall;
the main body being in fluid communication with a gas inlet for receiving a particle-contaminated gas;

a centrifugal accelerator to induce centrifugal acceleration of the particle-contaminated gas stream, wherein the centrifugal accelerator is fixed to the cone and located in an annular space between the cone and an outer wall;

a gas outlet for discharging a clean gas stream from the dual stage cyclone separator and in fluid communication with a center portion of the main body located proximate to the upper end of the main body;

a solids extraction port, wherein a sidewall of said main body defines a solids extraction port opening located between said upper end and said lower end for discharging large particles from said cyclone body; and a small particle discharge opening, wherein the small particle discharge opening is located at a distal end of the central opening.

14. The dual stage cyclone separator of claim 13, wherein the secondary cyclone inlet comprises at least one particle guide.

15. The dual stage cyclone separator of claim 13, further comprising a cap having a centrally located throughbore for allowing clean gas to exit the dual stage cyclone separator.

16. The dual stage cyclone separator of claim 15, wherein the cap is welded to the top of the dual stage cyclone separator.

17. A method for separating large particles and small particles entrained in a particle-contaminated gas stream utilizing a dual stage cyclone separator, the method utilizing:

a cyclone body having a main body having an upper end, a lower end, a cone with a downwardly decreasing diameter extending therebetween, and a central opening located inside the upper end, wherein the centrifugal accelerator is fixed to the cone and located in an annular space between the cone and an outer wall;

a primary stage cyclone barrel and a second stage cyclone barrel, wherein the second stage cyclone barrel is coaxial with, concentric within, and in fluid communication with the primary stage barrel having a second stage cyclone inlet;

the main body being in fluid communication with the gas inlet for receiving the particle-contaminated gas, wherein the gas inlet is located near the top of the cone;

a gas outlet for discharging a clean gas stream from the dual stage cyclone separator and in fluid communication with a center portion of the main body located proximate to the upper end of the main body;

a solids extraction port, wherein a sidewall of said main body defines a solids extraction port opening located between said upper end and said lower end for discharging large particles from said cyclone body; and a small particle discharge opening, wherein the small particle discharge opening is located at the lower end of the main body;

the method comprising the steps of:

forcing the particle-contaminated gas stream into the gas inlet and through a centrifugal accelerator in a dual stage cyclone separator comprising:

inducing centrifugal acceleration of the particle-contaminated gas stream through the centrifugal accelerator, wherein the centrifugal accelerator changes the flow of the particle-contaminated gas stream from upward to rotational;

separating large particles from the particle-contaminated gas stream through the primary stage cyclone barrel, wherein the large particles exit the dual stage cyclone separator through the solids extraction port;

creating a semi-clean gas stream comprising small particles, wherein the semi-clean gas stream flows into the second stage cyclone from the first stage cyclone;

separating small particles from the semi-clean gas stream through the second stage cyclone, wherein the small particles exit the second stage cyclone through the cone;

creating a clean gas stream not including small particles; and sending the clean gas stream through a clean gas outlet.

18. The method of claim 17, further comprising capturing the clean gas stream for use in energy generation.

19. The method of claim 17, further comprising allowing at least 2.5 revolutions of the particle-contaminated gas stream around the primary stage cyclone.

20. The method of claim 17, further comprising assembling more than one dual stage cyclone vessel in an assembly.

21. The method of claim 17, wherein the particle-contaminated gas stream, semi-clean gas stream, and clean gas stream do not change direction of rotational flow.

* * * * *